US010029396B2

(12) United States Patent
Abe et al.

(10) Patent No.: US 10,029,396 B2
(45) Date of Patent: Jul. 24, 2018

(54) SEAL CARVING APPARATUS AND THERMAL CARVING MACHINE

(71) Applicant: SHACHIHATA INC., Nagoya-Shi (JP)

(72) Inventors: Eiji Abe, Nagoya (JP); Masayoshi Uchida, Nagoya (JP)

(73) Assignee: Shachihata Inc., Nagoyga-Shi (JP)

( * ) Notice: Subject to any disclaimer, the term of this patent is extended or adjusted under 35 U.S.C. 154(b) by 318 days.

(21) Appl. No.: 14/885,127

(22) Filed: Oct. 16, 2015

(65) Prior Publication Data

US 2016/0121519 A1    May 5, 2016

(30) Foreign Application Priority Data

Oct. 30, 2014 (JP) ................... 2014-222080
Feb. 20, 2015 (JP) ................... 2015-031763
Mar. 17, 2015 (JP) ................... 2015-052962

(51) Int. Cl.
*B29C 35/02* (2006.01)
*B41K 1/02* (2006.01)
*B41K 1/50* (2006.01)
*B41D 7/00* (2006.01)

(52) U.S. Cl.
CPC ................ *B29C 35/02* (2013.01); *B41D 7/00* (2013.01); *B41K 1/02* (2013.01); *B41K 1/50* (2013.01)

(58) Field of Classification Search
CPC ......... B29C 67/004; B29C 44/02; B42K 3/00; B29K 2101/12
USPC ............... 101/405, 333, 332, 337, 336, 487; 156/293, 538; 400/223, 203, 211, 237; 264/280, 322; 425/385
See application file for complete search history.

(56) References Cited

U.S. PATENT DOCUMENTS

| | | | | |
|---|---|---|---|---|
| 5,845,573 A | * | 12/1998 | Miyata | ...................... B41D 7/00 101/128.4 |
| 5,915,299 A | * | 6/1999 | Kuriyama | ............. G03F 7/0015 101/128.21 |
| 5,957,053 A | * | 9/1999 | Hayama | .................... B41D 7/00 101/333 |
| 6,367,382 B1 | | 4/2002 | Imamaki et al. | |
| 6,460,456 B1 | * | 10/2002 | Sugiyama | ................ B41D 7/00 101/327 |
| 6,732,649 B1 | * | 5/2004 | Wall | ........................ B41D 7/00 101/333 |

(Continued)

FOREIGN PATENT DOCUMENTS

EP    2 687 379 A1    1/2014
JP    H07-257001 A1   10/1995

(Continued)

OTHER PUBLICATIONS

Extended European Search Report (Application No. 15192064.2) dated Apr. 14, 2016.

(Continued)

*Primary Examiner* — Nahida Sultana
(74) *Attorney, Agent, or Firm* — Burr & Brown, PLLC

(57) ABSTRACT

Dot pattern perforations predetermined according to a type (kind and carving size) of a workpiece are formed in a part of a body of an attachment where the workpiece is to be set. A seal carving apparatus detects the dot pattern of the mounted attachment by means of photosensors to identify the type of the workpiece. This makes it possible to check consistency between type information on the workpiece input by a customer and type information identified from the dot pattern to prevent mismounting of the attachment or an erroneous carving operation.

20 Claims, 43 Drawing Sheets

(56) References Cited

U.S. PATENT DOCUMENTS

| | | | | |
|---|---|---|---|---|
| 2004/0003735 A1* | 1/2004 | Humal | ............... | B41C 1/055 |
| | | | | 101/401.1 |
| 2014/0020584 A1* | 1/2014 | Abe | ............... | B41K 1/00 |
| | | | | 101/333 |
| 2014/0048206 A1* | 2/2014 | Giuliani | ............... | B65C 3/065 |
| | | | | 156/293 |
| 2014/0196851 A1* | 7/2014 | Golda | ............... | H01L 23/5384 |
| | | | | 156/538 |
| 2014/0356985 A1* | 12/2014 | Ricci | ............... | H01L 21/67109 |
| | | | | 438/11 |
| 2015/0101757 A1* | 4/2015 | Ohnishi | ............... | B29C 65/18 |
| | | | | 156/538 |
| 2016/0200041 A1* | 7/2016 | Chergui | ............... | B29C 67/0011 |
| | | | | 72/342.94 |
| 2016/0204017 A1* | 7/2016 | Roesner | ............... | B25J 11/0095 |
| | | | | 156/272.2 |
| 2017/0173853 A1* | 6/2017 | Miller | ............... | B29C 35/002 |

FOREIGN PATENT DOCUMENTS

| | | | |
|---|---|---|---|
| JP | 2000-280589 | A1 | 10/2000 |
| JP | 2003-145907 | A1 | 5/2003 |
| JP | 2013-095048 | A1 | 5/2013 |
| JP | 2014-043092 | A1 | 3/2014 |

OTHER PUBLICATIONS

Japanese Office Action (Application No. 2014-222080) dated Dec. 4, 2017 (with English translation).

* cited by examiner

Side    Head surface

FIG. 9

| Cassette type | Kind | Processing size (mm) | Perforation pattern | Binary |
|---|---|---|---|---|
| 1 | Stamp | 10 × 10 | ●○○○● | 01110 |
| 2 | | 10 × 20 | ●○○●○ | 01101 |
| 3 | | 15 × 20 | ●○○●● | 01100 |
| 4 | | 15 × 30 | ●○●○○ | 01011 |
| 5 | | 20 × 20 | ●○●○● | 01010 |
| 6 | | 20 × 30 | ●○●●○ | 01001 |
| 7 | Label | 15 × 20 | ○●○○● | 10110 |
| 8 | | 15 × 30 | ○●○●○ | 10101 |
| 9 | | 20 × 25 | ○●○●● | 10100 |
| 10 | | 20 × 30 | ○●●○○ | 10011 |
| 11 | | 30 × 40 | ○●●○● | 10010 |

(V)

(VI)

(VII)

IV-IV Cross section

FIG. 25

| Stamp type | Kind | Processing size (mm) | Relative position Dp (mm) |
|---|---|---|---|
| 1 | Rectangular | 20 × 50 | 132 |
| 2 | | 25 × 90 | 36 |
| 3 | | 30 × 65 | 110 |
| 4 | | 35 × 70 | 100 |
| 5 | | 40 × 80 | 48 |
| 6 | | 50 × 90 | 26 |
| 7 | | 60 × 100 | 17 |
| 8 | Round type | φ40 | 120 |

B-B Cross section

III-III Cross section

SEAL CARVING APPARATUS AND THERMAL CARVING MACHINE

BACKGROUND OF THE INVENTION

1. Field of the Invention

The present invention relates to a seal carving apparatus or a thermal carving machine that forms a seal on a workpiece such as a stamp.

2. Description of Related Art

A seal carving apparatus or a thermal carving machine performs thermal carving process of selectively and thermally driving individual heat generating elements of a thermal head while moving a workpiece of a porous material or the like, and the thermal head in relative to each other with the thermal head abutting on the workpiece to thereby form a desired seal on the workpiece (see Patent Literature 1, for example). As the porous material subjected to seal carving by the thermal carving machine is mounted on an ink impregnated member attached to a holder, a stamp is assembled. Recently, thermal carving machines have been demanded of general versatility that permits carving of stamps of various seal patterns and sizes in response to customers' requests, and of convenience that permits anyone to use the thermal carving machine in a shop. To this end, for example, attachments of plural types that fit the types (rectangular type, round type, etc.) of stamps and their carving sizes are prepared beforehand, and seal carving is performed by a thermal carving machine to which a dedicated attachment having a porous material set thereon is mounted.

For example, Patent Literature 2 discloses, as prior art relevant to the invention, a label creating apparatus that forms a print on a print tape retained in a tape cartridge. This type of tape cartridge is a consumable. To print information on the type of the cartridge currently in use on a tape end at the timing of replacement of the cartridge, the label creating apparatus of Patent Literature 2 has switch holes formed in the cartridge body to detect attribute (the width, color etc. of the tape) of the cartridge body.

CITATION LIST

Patent Literature

Patent Literature 1: Japanese Patent Application Laid-open No. 2014-43092
Patent Literature 2: Japanese Patent Application Laid-open No. 2013-95048

SUMMARY OF INVENTION

Problem to be Solved by the Invention

The aforementioned conventional thermal carving machines can perform seal carving on workpieces of various types and carving sizes (which are referred to as "type" of a workpiece), but need a dedicated attachment should be prepared for each type. Further, a user (including a person who has ordered a stamp or a sales person) needs to select an attachment fit for a workpiece on which a seal is to be formed from among a plurality of attachments prepared in each case. This involves a complicated work, and may result in mounting of a wrong attachment on the carving apparatus.

The invention has been made in view of such problems, and it is an object of the invention to provide a seal carving apparatus that performs seal carving on a workpiece set on a dedicated attachment, and has high general versatility and convenience that can prevent mismounting of an attachment which is not fit for the workpiece, and an improper processing manipulation.

Further, it is an object of the invention to provide a thermal carving machine that can cope with seal carving on workpieces of various types and carving sizes using only a single attachment.

Means for Solving the Problems

To solve the aforementioned problems, the invention is a seal carving apparatus including a thermal head having a plurality of heat generating elements disposed in a line, a dedicated attachment where a workpiece on which a seal is intended to be formed is set, loading means that moves the workpiece set on the attachment and the thermal head in relative to each other with the workpiece being in abutment with the attachment, and control means that selectively and thermally drives individual heat generating elements of the thermal head while controlling the relative movement performed by the loading means to perform a carving process of forming a seal on the workpiece, wherein dot pattern perforations predetermined according to a type of the workpiece to be set are formed in a part of a body of the attachment.

The seal carving apparatus with this configuration can identify the type of a workpiece set on an attachment based on the dot pattern perforations of the mounted attachment. This makes it possible to prevent mismounting of an attachment which does not fit the workpiece, an improper processing manipulation and the like.

The seal carving apparatus may include reading means that reads the dot pattern perforations formed in the attachment at a position where the attachment is mounted.

According to the seal carving apparatus with this configuration, the reading means can read the dot pattern perforations at the position where the attachment is mounted before starting the carving to identify the type of the workpiece. This makes it possible to prevent an improper processing manipulation or the like in advance.

It is preferable that the reading means in the seal carving apparatus should be a photosensor that reads the dot pattern perforations by means of transmission or reflection of light.

According to the seal carving apparatus with this configuration, the photosensor can read the dot pattern perforations in a non-contact manner. Accordingly, misalignment or the like of the attachment which would otherwise be caused by an unnecessary contact to read the dot pattern perforations does not occur, so that the accuracy of the relative positional relation between the workpiece and the thermal head can be maintained.

In the seal carving apparatus, it is preferable that the control means should be communicatively connected with a terminal device operable by a user, and perform a carving process of examining consistency between information on the type of the workpiece input to the terminal device by the user and information on the dot pattern perforations read by the reading means.

According to the seal carving apparatus with this configuration, the consistency between type information on a current workpiece that is identified based on the dot pattern perforations of the mounted attachment and type information on a workpiece input by the user is examined. Accordingly, even when an attachment of a type different from the one fit for the kind and carving size of the workpiece a customer has ordered is mounted on the seal carving apparatus by mistake, for example, initiation of the carving process can be prevented. Therefore, it is possible to prevent an improper processing manipulation or the like in advance, and enhance the user's convenience.

In the seal carving apparatus, a notch that is blocked by a part of the workpiece when the workpiece is set may be formed in the body of the attachment, and as the reading means reads a state of the notch at a position in which the attachment is loaded, a setting state of the workpiece to the attachment may be examined.

According to the seal carving apparatus with this configuration, the reading means that reads the dot pattern perforations of an attachment can examine the setting state of a workpiece. Accordingly, even when an attachment is mounted on the seal carving apparatus without a workpiece set on the attachment or even when an attachment is mounted on the seal carving apparatus with a workpiece improperly set on the attachment, initiation of the carving process can be prevented. Therefore, it is possible to prevent an improper processing manipulation or the like in advance, enhancing the user's convenience. Moreover, the reading means serves to perform two functions of reading dot pattern perforations and examining the setting state of a workpiece, so that the general configuration of the seal carving apparatus can be simplified.

The invention is also a thermal carving machine including a thermal head having a plurality of heat generating elements disposed in a line, an attachment where a workpiece on which a seal is to be formed is set via an adapter member, loading means that loads the attachment inside, and moves the workpiece set on the attachment and the thermal head in relative to each other with the workpiece being in abutment with the attachment, and control means that selectively and thermally drives individual heat generating elements of the thermal head while controlling the relative movement performed by the loading means to perform a carving process of forming a seal on the workpiece, wherein the workpiece is held between a reference surface formed on the attachment and an inclined surface formed on the adapter member.

According to such a thermal carving machine, as a workpiece is held between a reference surface formed on the attachment and an inclined surface formed on the adapter member, workpieces of various types may be set on a single attachment, thus enhancing the general versatility. In addition, the external size of a workpiece can be identified based on the position of the adapter member on the attachment, so that the carving size, the position of starting the carving, etc. can be determined.

It is preferable that in the thermal carving machine, the inclined surface of the adapter member should include two abutment surfaces inclined in such a way that an interval therebetween becomes narrower toward a widthwise center of the attachment. The abutment of the two abutment surfaces abut on a workpiece at two locations permits the workpiece to be held stably. Further, the adapter member can be made compact.

It is preferable that in the thermal carving machine, the control means should identify the type of the workpiece based on a relative position of the adapter member on the attachment. This makes it possible to prevent setting of a wrong workpiece, an improper processing manipulation and the like.

It is preferable that a slit hole extending in a loading direction should be formed in a widthwise center of the attachment, and a photosensor that detects the adapter member through the slit hole should detect the relative position of the adapter member on the attachment. Accordingly, misalignment or the like of the attachment which would otherwise be caused by an unnecessary contact does not occur, so that the accuracy of the relative positional relation between the workpiece and the thermal head can be maintained.

It is preferable that in the thermal carving machine, both end portions of the adapter member should be fitted at predetermined positions of the attachment. It is also preferable that a type code indicative of a type of a corresponding workpiece should be printed at the predetermined positions of the attachment where the both end portions of the adapter member are fitted. This makes it possible to securely fix the adapter member at the predetermined position of the attachment. Further, a user sees at a glance at which position of the attachment the adapter member should be fitted, thus enhancing the convenience.

The invention is also a thermal carving machine including a thermal head having a plurality of heat generating elements disposed in a line, an attachment where a workpiece on which a seal is to be formed is set, loading means that loads the attachment inside, and moves the workpiece set on the attachment and the thermal head in relative to each other with the workpiece being in abutment with the attachment, and control means that selectively and thermally drives individual heat generating elements of the thermal head while controlling the relative movement performed by the loading means to perform a carving process of forming a seal on the workpiece, wherein a mount part having a wall surface on which one side surface of the workpiece abuts with the workpiece set on the attachment is formed on the attachment, and at least one holding member that is elastically urged toward an opposite surface of the workpiece to the one side surface thereof to hold the workpiece in abutment with the opposite surface is provided on the mount part.

A second holding member that is elastically urged toward another surface of the workpiece that is orthogonal to the opposite surface of the workpiece to hold the workpiece in abutment with the another surface should be further provided on the mount part.

Moreover, the invention is a thermal carving machine including a thermal head having a plurality of heat generating elements disposed in a line, an attachment where a workpiece on which a seal is to be formed is set, loading means that loads the attachment inside, and moves the workpiece set on the attachment and the thermal head in relative to each other with the workpiece being in abutment with the attachment, and control means that selectively and thermally drives individual heat generating elements of the thermal head while controlling the relative movement performed by the loading means to perform a carving process of forming a seal on the workpiece, wherein a mount part having a plurality of stepped grooves having widths respectively fitting one side surfaces of the workpieces of different sizes and becoming wider stepwise is formed on the attachment, the workpiece is set on attachment with the workpiece being fitted in one of the stepped grooves that fits the workpiece and the one side surface abutting on a reference wall surface of that stepped groove, and a holding member that is elastically urged toward an opposite surface of the workpiece to the one side surface thereof is provided on the mount part.

It is preferable that the control means in the thermal carving machine should identify the type of the workpiece based on a position of the holding member on the attachment.

Furthermore, the invention is a thermal carving machine including a thermal head having a plurality of heat generating elements disposed in a line, an attachment where a workpiece on which a seal is to be formed is set, loading means that loads the attachment inside, and moves the workpiece set on the attachment and the thermal head in relative to each other with the workpiece being in abutment with the attachment, and control means that selectively and thermally drives individual heat generating elements of the thermal head while controlling the relative movement performed by the loading means to perform a carving process of forming a seal on the workpiece, wherein a plurality of detection switches that enable the workpiece to be fitted at an arbitrary position on a surface of that side of the attachment where the workpiece is to be set and are capable of detecting the workpiece are disposed in a lattice form at respective intersections orthogonal to one another.

According to such a thermal carving machine, various types of workpieces can be set on a single attachment, thus enhancing the general versatility. Further, a workpiece can be set at an arbitrary position of the attachment, thus enhancing the convenience.

In addition, shallow-hole fitting parts that are respectively fitted to the detection switches are formed at at least two corners diagonally positioned on that side of the workpiece which is set on the attachment, and as the shallow-hole fitting parts are fitted to the detection switches with the workpiece being set on the attachment, the detection switches are turned on, so that at least a setting position of the workpiece on the attachment can be identified based on positions of the turned-on detection switches. It is also possible to further identify a carving size of the workpiece based on the positions of the turned-on detection switches.

It is preferable that in the thermal carving machine, deep-hole fitting parts that have holes deeper than holes of the shallow-hole fitting parts and are fitted to the detection switches are formed at corners on that side of the workpiece which is set on the attachment and different from the at least two corners where the shallow-hole fitting parts are formed, and with the workpiece being set on the attachment, an OFF state of the detection switches to which the deep-hole fitting parts are fitted can be maintained.

Effects of the Invention

The seal carving apparatus according to the invention can prevent mismounting of an attachment which does not fit a workpiece, an improper processing manipulation different from the processing for the one ordered by a customer, and the like. In addition, the thermal carving machine according to the invention can form a seal on various types of workpieces using only a single attachment. A workpiece currently set can be identified. Therefore, it is also possible to provide a seal carving apparatus or a thermal carving machine with high general versatility and convenience.

BRIEF DESCRIPTION OF DRAWINGS

FIG. 9 is a diagram exemplifying dot patterns predetermined in correspondence to the types of workpieces.

FIG. 25 is a table exemplifying the relation between the type of a workpiece and a fitting position (relative position) of an adapter member according to the second embodiment.

DETAILED DESCRIPTION OF THE INVENTION

1. First Embodiment

A seal carving apparatus 100 according to a first embodiment is described with reference to FIGS. 1 to 15.

Figure 1:
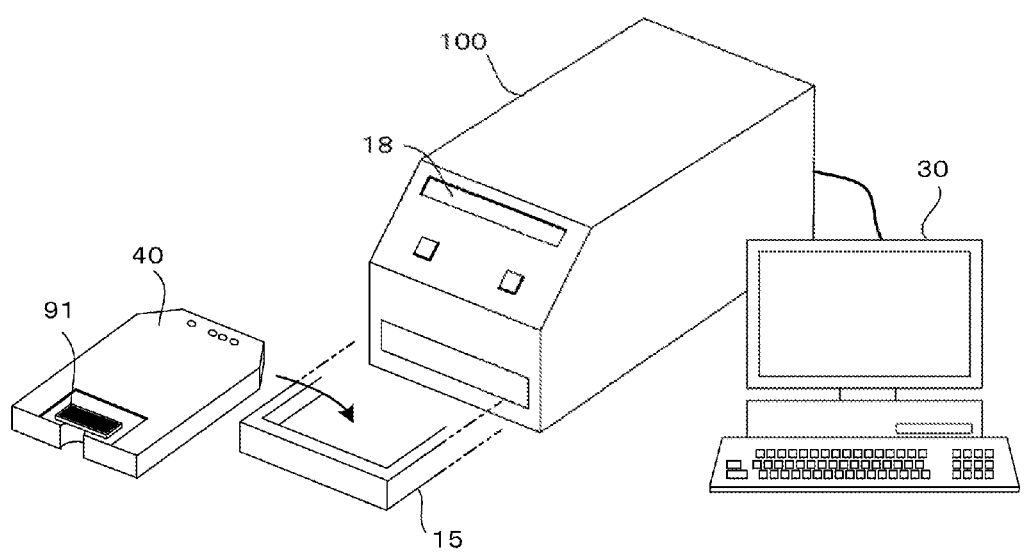
FIG. 1 is an external view illustrating the general configuration of a seal carving system according to a first embodiment.

FIG. 1 is an external view illustrating the general configuration of a seal carving system including the seal carving apparatus according to the first embodiment. As illustrated in FIG. 1, the seal carving apparatus 100 is communicatively connected with a terminal device 30 serving as input manipulation means which is operated by a user (including an operator and a customer). FIG. 1 illustrates an example of a personal computer (PC) as the terminal device 30. It is to be noted however that the terminal device is not particularly limited to a PC, but may be anything including means that is communicatable with the seal carving apparatus 100 and with which a user can perform an input manipulation; for example, a portable terminal device such as a tablet PC or a smartphone may be available. Further, instead of a terminal device, a touch-panel type computer may be integrally connected to the seal carving apparatus 100 in the system.

A seal pattern of a stamp that a customer orders is prepared by, for example, editor software that runs on the terminal device 30, the prepared seal pattern (artwork data, monochromatic image data) is translated to the seal carving apparatus 100. Image data read out by a scanner, a camera or the like may be fetched into the terminal device 30, and seal pattern data may be prepared using dedicated software. Further, a customer may upload seal pattern data to a host server on a Web site in advance, and a member of a workshop may download the seal pattern data onto the terminal device 30 and process it with the seal carving apparatus 100.

One of workpieces on which seals may be formed with the seal carving apparatus 100 is, for example, a porous impression die 91 as shown in FIG. 1. As described later, a seal pattern is formed on the porous impression die 91 with the seal carving apparatus 100, and then the porous impression die 91 is mounted on an ink impregnated member 98 attached to a holder 99, thereby assembling a porous stamp assembly 901 having the seal pattern corresponding to what has been ordered by the customer. Furthermore, the workpiece on which a seal can be formed with the seal carving apparatus 100 may be an unillustrated label sheet. As mentioned above, the workpieces on which seal face can be formed with the seal carving apparatus 100 include at least a stamp and a label sheet. A plurality of seal carving sizes can be selected for each of kinds of workpieces. To this end, plural types of attachments 40 that are fabricated exclusively according to the types of workpieces are prepared in advance. The "type" of a workpiece means to include the aforementioned "kind" and the "carving size" of a seal corresponding to the kind.

Next, the body of the seal carving apparatus 100 is described in connection to the porous impression die 91 which is a stamp a kind of the workpiece by way of example. The seal carving apparatus 100 selectively and thermally drives individual heat generating elements 12a on a thermal head 12 while relatively moving the thermal head 12 and the porous impression die 91 in abutment with each other to achieve melt-solidification of a porous material, thereby implementing line-by-line formation of a seal. The term "abutment" means that the height position of the thermal head 12 matches with the height position of the top surface of the workpiece (porous impression die 91). If the heat of radiation from the thermal head 12 heats and melts the porous material, the state where the thermal head 12 faces the porous material with a gap of microns therebetween is included in "abutment." The state where the heat from the thermal head 12 is loaded to the porous material via an intervention of a resin film or the like is also conceptually included in "abutment." The term "relative movement" may be the movement of the porous impression die 91 with the thermal head 12 fixed, or the movement of the thermal head 12 with the porous impression die 91 fixed. An embodiment of the former configuration of moving the porous impression die 91 with the position of the thermal head 12 fixed is described herein.

The seal carving apparatus 100 includes a tray 15 which is means for loading the attachment 40. The tray 15 is reciprocally loaded between a discharge position where the attachment 40 can be attached or detached and an accommodation position inside the seal carving apparatus 100 by a loading mechanism 16 (see FIG. 2) provided inside the seal carving apparatus 100. A display part 18 that displays the operational state of the apparatus (completion of preparation, mounting of the attachment, reading data, printing, discharge of the attachment, an error, etc.), the type of the workpiece (kind and carving size), and the like in characters or the like, and manipulation switches for performing various manipulations, etc. are provided on the front surface portion of the seal carving apparatus 100. A communication connector, such as USB, D-SUB or Ethernet (registered trademark), for communicative connection to the terminal device 30, a power supply connector, and the like, though not illustrated, are provided on the rear surface portion of the seal carving apparatus 100.

Figure 2:
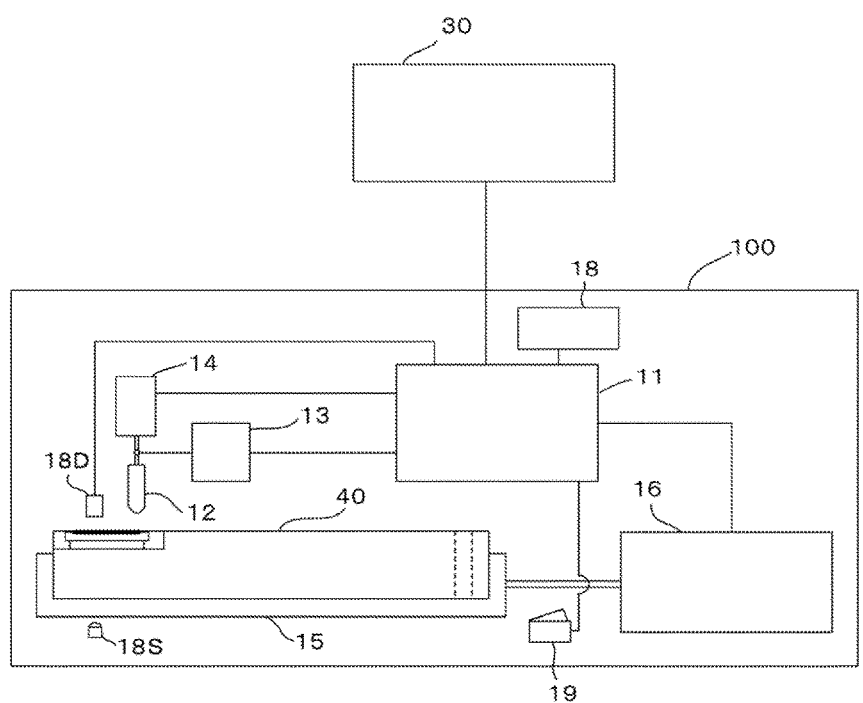
FIG. 2 is a block diagram illustrating the schematic configuration of a seal carving apparatus according to the first embodiment.

FIG. 2 is a block diagram illustrating the schematic configuration of the seal carving apparatus 100 according to the first embodiment. The seal carving apparatus 100 includes the thermal head 12 having a plurality of heat generating elements 12a, 12a, . . . , the attachment 40 on which the porous impression die 91 is set, a loading mechanism 16 that relatively moves the porous impression die 91 set on the attachment 40 and the thermal head 12 in abutment with each other, and a control device 11 that performs a thermal carving control of thermally driving the heat generating elements 12a, 12a, . . . on the thermal head 12 while controlling the movement loaded out by the loading mechanism 16 to form a seal on the top surface of the porous impression die 91.

Figure 3:
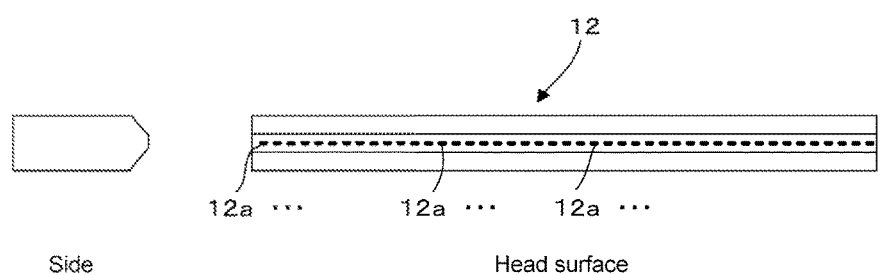
FIG. 3 is a two-side view illustrating a head surface and a side surface of a thermal head.

FIG. 3 is a two-side view illustrating the head surface and the side surface of the thermal head 12. As illustrated in this diagram, the plurality of heat generating elements 12a, 12a, . . . are disposed in a line at equal intervals on the head surface of the thermal head 12 (the surface that abuts on the porous impression die 91 to be subjected to seal carving). The layout pitch of the heat generating elements 12a, 12a, i.e., the size of a single heat generating element 12a is equivalent to the theoretical minimum carving pixel size of seal carving. The dot density of the heat generating elements 12a on the thermal head 12 may be set to, for example, 300 dpi (dots/inch) or so. As thermal drive means 13 selectively supplies the individual heat generating elements 12a, 12a, . . . within a period of the curving cycle of one line under control of the control device 11, the thermal head 12 forms a single line of the seal on the porous impression die 91. The thermal head 12 is moved, under control of the control device 11, between the positions of the thermal head 12 close to and away from the workpiece, by an elevation mechanism 14.

Figure 4:
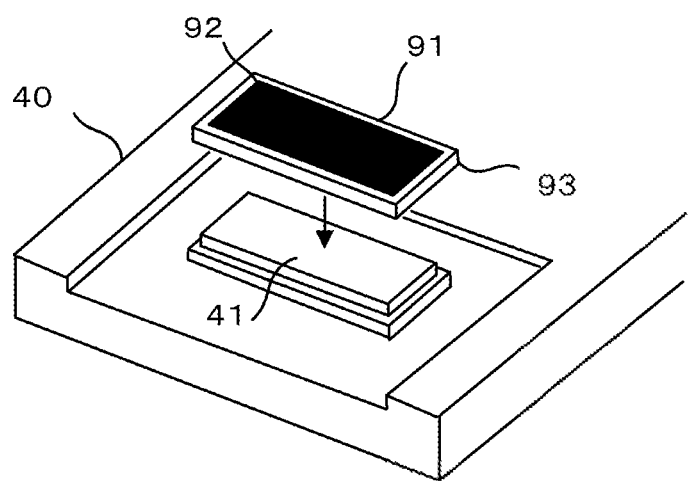
FIG. 4 is a perspective view illustrating the exterior appearance of a porous impression die to be set on an attachment according to the first embodiment.
Figure 5:
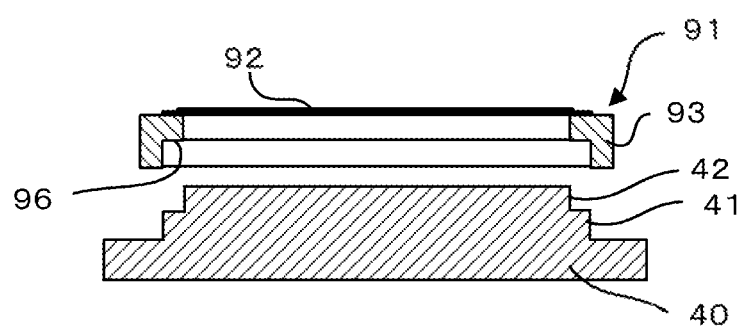
FIG. 5 is a cross-sectional view illustrating the porous impression die to be set on the attachment according to the first embodiment.

FIG. 4 is a perspective view illustrating the exterior appearance of the porous impression die 91 to be set on the attachment 40. FIG. 5 is a cross-sectional view of the porous impression die 91. As illustrated in FIGS. 4 and 5, the porous impression die 91 is formed to have a rectangular enclosing frame 93 and a porous film 92 stretched so as to block the upper surface opening of the frame 93. The term "upper surface" or "top surface" refers to the surface of that side where a seal is to be formed, and the term "lower surface" or "bottom surface" refers to the surface of a side opposite to that side where a seal is to be formed. The lower surface opening of the frame 93 is formed wider than the upper surface opening, and a recessed step 96 is formed inside the frame 93 as illustrated in FIG. 5. The frame 93 with such a shape is molded of, for example, a thermoplastic resin having a small thermal deformation.

The material for the porous film 92 is not particularly limited as long as it is a porous material whose top surface can be heated and melted by the thermal head 12. The raw materials available for the porous material may include, for example, thermoplastic elastomers of styrene type, vinyl chloride type, olefin type, polyester type, polyamide type, and urethane type. To obtain porousness, a filler, such as starchy, sodium chloride, sodium nitrate or calcium carbonate, and a row material resin are kneaded into a sheet with a heating/pressuring kneader, a heating roller or the like, and after the sheet is cooled, the filler is eluted with water or dilute acid water. The melting temperature of the porous material prepared by this method is the same as that for the raw material resin. Adding an accessory component, such as pigment, dye or organic substance, to the resin permits adjustment of the melting temperature of the porous material. The melting temperature of the porous material is, for example, 70° C. to 120° C.

The porosity and pore diameter of the porous film 92 can be adjusted by the particle size of the dissolved material to be kneaded and the content thereof. The porosity of the porous film 92 is, for example, 50% to 80%, and the pore diameter thereof is 1 µm to 20 µm. The porous film 92 may have a double-layered structure with the lower layer having a pore diameter of 50 µm to 100 µm. The porous impression die 91 which is the target for seal carving is prepared by the porous film 92 thermally fused to the periphery of the upper surface opening of the frame 93.

Figure 6:
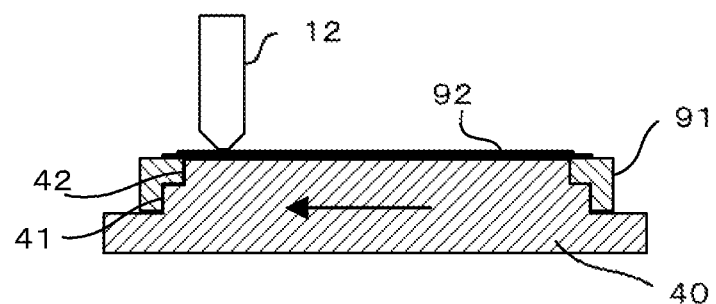
FIG. 6 is a cross-sectional view of the porous impression die at the time of thermal carving.

FIG. 6 is a cross-sectional view of the porous impression die 91 at the time of thermal carving. As illustrated in FIGS. 5 and 6, the porous impression die 91 is set on the attachment 40 as the recessed step 96 is fitted over a projecting step 42 of a pedestal 41 from the bottom side of the frame 93. With the porous impression die 91 set on the fitting pedestal 41 of the attachment 40, the horizontal position of the bottom surface of the porous film 92 coincides with that of the top surface of the projecting step 42, so that both surfaces preferably contact with each other. In other words, the frame 93 of the porous impression die 91 is held on the pedestal 41, the bottom surface of the porous film 92 is received by the top surface of the projecting step 42. As the porous impression die 91 is moved in a direction orthogonal to the line of the thermal head 12 abutting on the top surface of the porous impression die 91 set on pedestal 41, line-by-line seal carving process is carried out.

When the heat generating elements 12a are driven with the thermal head 12 in direct contact with the top surface of the porous impression die 91, the heated and melted porous material is adhered to the thermal head 12, which causes an inconvenience of increasing the frictional force or inadequate carving. To overcome those problems, a resin film (not shown) may be intervened between the porous impression die 91 and the thermal head 12. Such a resin film needs to have a heat resistance with a higher melting point than that of the porous material used for the porous impression die 91, and low friction and smoothness that do not cause the seal to furrow. As to the resin film, poly films of materials such as cellophane, acetate, polyvinyl chloride, polyethylene, polypropylene, polyester, polyethylene terephthalate, polytetrafluoroethylene, and polyimide, may be used. The intervention of such a resin film can reduce the influence of the residual heat remaining in the thermal head 12 in addition to the prevention of furrows of the porous material.

The heating value Q when one heat generating element 12a on the thermal head 12 is driven is expressed by the following formula 1.

$$Q = k \times I \times t \quad (1)$$

where k is the thermal conversion efficiency coefficient, I is the drive current, and t is the drive time. According to the formula 1, the heating value Q of the heat generating element is proportional to the amount of drive Dq (Dq=I×t) which is the product of the drive current and the drive time.

Figure 7:
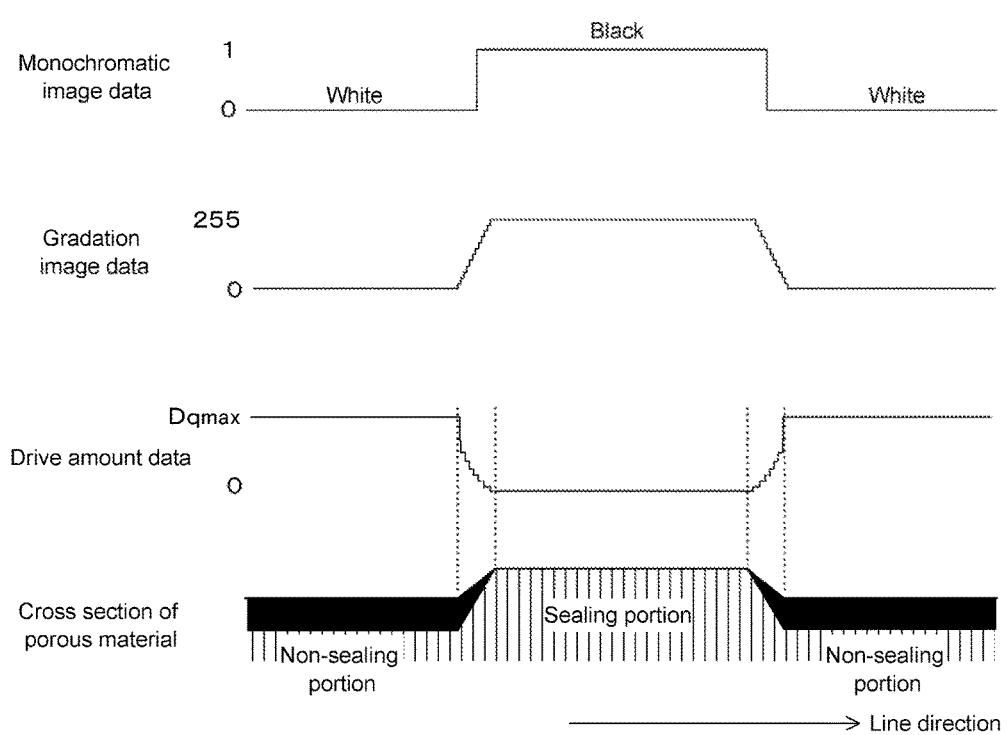
FIG. 7 is a diagram exemplifying artwork data, gradation image data, driving amount data, and the cross section of a porous material.

As illustrated in FIG. 7, artwork data representing a seal pattern to be stored in a memory in the terminal device 30 or the control device 11 is of a binary (monochromatic) bit map form. For example, the pixel value of what is called "black" corresponds to the print portion (impression part) of a stamp is "1." The pixel value of what is called "white" corresponds to the non-print portion (non-impression part) of a stamp is "0." This binary artwork data representing a seal pattern to be carved is referred to as "monochromatic image data." The basic operation of seal carving in the seal carving apparatus 100 is to thermally drive the heat generating elements 12a on the thermal head 12 to heat and melt the top surface of the porous impression die 91 which is in abutment with the thermal head 12 for solidification of the top surface. As a result, the non-impression part which has lost the porousness is formed on the top surface of the porous impression die 91. Therefore, basically, the control device 11 can carves a seal by performing what is called ON/OFF control of not driving the heat generating elements corresponding to the print portion (impression part) (Dq=0) and driving the heat generating elements corresponding to the non-impression part (Dq=Dqmax) according to the monochromatic image data.

However, such simple ON/OFF control according to binary monochromatic image data brings about a problem such that the residual heat accumulated in the thermal head 12 is loaded at the position of the edge of the non-impression part to the region of a nearby impression part. As a result, part of the porousness (ink permeability) of the contour of the print portion is lost, which may bring about an inconvenience such that the contour becomes narrower than that of the original image data or is deformed or the like. To prevent such deformation of a print, the control device 11 may include gradation correction means for correcting monochromatic image data to gradation image data having gradation of 8 bits (256 gray scales).

The gradation correction means prepares gradation image data corrected so that the pixel value monotonously changes stepwise in the boundary region (region at which the values of white and black are reversed) between the print portion (impression part) and the non-impression part of monochromatic image data as illustrated in, for example, FIG. 7. "Monotonous change" referred to herein includes a case where gradation image data is corrected non-linearly based on monochromatic image data.

Driving amount conversion means included in the control device 11 converts one line of gradation image data to data on the driving amount of each heat generating element 12a on the thermal head 12. At the time of calculating the driving amount Dq of the heat generating elements 12a, the driving amount conversion means can consider the non-linear correlation property between the driving amount of the heat generating elements and the porousness (ink permeability).

Now, the permeation ratio of ink which is an index indicating the porousness quantitatively can be defined as a permeation ratio which is normalized with the initial porosity of the porous material before thermal carving being regarded as 1 (100%) and the porosity of the porous material after the heat generating elements are driven with the maximum driving amount (Dq=Dqmax) for thermal carving being regarded as 0 (0%). Because the porous material contracts slightly and changes its thermal conductivity according to heating and melting, the driving amount of the heat generating elements and the ink permeability after thermal carving may not necessarily be proportional to each other. To correct this non-linearity, correlation property data between the driving amount of the heat generating elements and the ink permeability, which has been measured through an experiment or the like beforehand, should preferably be stored in, for example, the memory of the control device 11.

The gradation correction means may prepare gradation image data corrected based on monochromatic image data in view of the aforementioned non-linear correlation property (relation between the driving amount of the heat generating elements and the ink permeability). In this case, gradation image data having a relation such that the gradation value of the gradation image data and the driving amount of the heat generating elements are proportional to each other is prepared. Accordingly, the driving amount conversion means can obtain driving amount data from the gradation image data directly (specifically, without performing the non-linear correction or the like).

Thermal drive control means included in the control device 11 performs PWM (Pulse Width Modulation) control on the thermal drive means 13 to control the individual heat generating elements 12a on the thermal head 12 with the thermal driving amount Dq according to the thermal drive data, thereby forming a seal face on the porous impression die 91 line by line. The PWM control is the method of setting the amplitude of the drive current which flows into the heat generating elements 12a constant and controlling the pulse duration (duty ratio) to thereby control the driving amount Dq to the heat generating elements 12a. Alternatively, the thermal drive control means may control the thermal driving amount Dq under PWM control with the amplitude of the voltage to be applied to the heat generating elements 12a being set constant.

The seal carving apparatus 100 may also perform seal carving process with gradation given to the contour of the print portion, a logo or the like to decorate the print using the above-described gradation correction means, driving amount conversion means and thermal drive control means. In this case, the pattern data (artwork data) of the seal which is decorated with gradation or the like may have gradation values beforehand.

Figure 8:
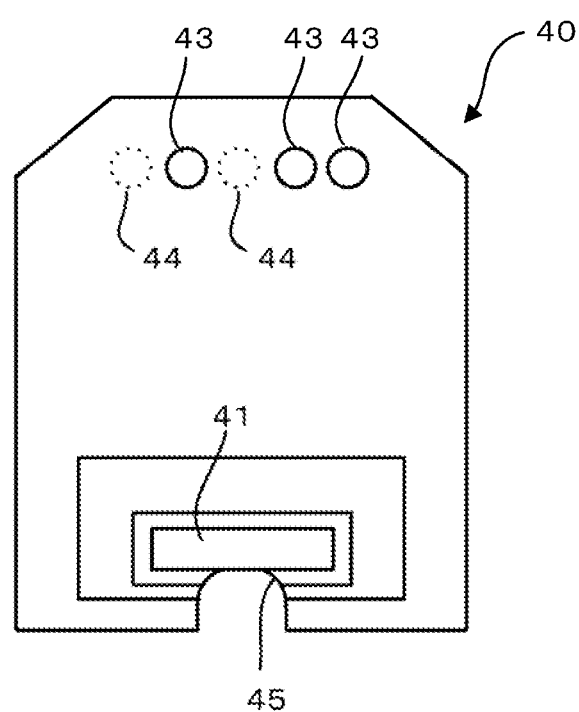
FIG. 8 is a front view of an attachment for the porous impression die according to the first embodiment.

Next, the attachment 40 which is mounted on the seal carving apparatus 100 is described. A workpiece for the seal carving apparatus 100, such as the porous impression die 91, is set on the attachment 40. FIG. 8 is a front view of the attachment 40 for the porous impression die 91. The pedestal 41 that is fitted over the bottom side of the porous impression die 91 is formed on the top surface of the body of the attachment 40. A row of dot pattern perforations 43, 43, . . . predetermined in correspondence to the type of a workpiece to be set is formed through a part of the body of the attachment 40. A notch 45 cut away in a U shape from an end of the attachment 40 to part of the pedestal 41.

FIG. 9 exemplifies an example of the dot patterns predetermined in correspondence to the types of workpieces. A dot pattern for identifying a type of a workpiece and/or a type of the attachment 40 is an array of the combination of the perforations 43, 43, . . . and blanks 44, 44, . . . . Here, "blank" means a region in the dot pattern where perforations are not formed in the body of the attachment 40. For example, the dot pattern of the perforations 43, 43, . . . illustrated in FIG. 8 is '01011' in binary notation. With reference to FIG. 9, therefore, this dot pattern can be identified as a type "4" for the attachment for a workpiece whose kind is "stamp" and whose carving size is "15×30 mm."

Figure 10A:
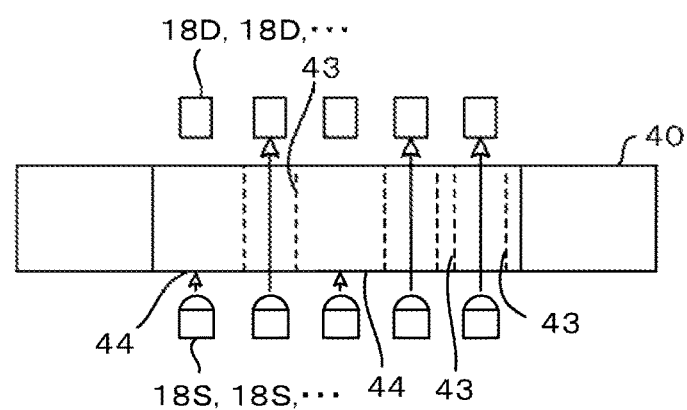
FIG. 10A is a diagram illustrating an embodiment of reading means.

The seal carving apparatus 100 includes reading means that reads a dot pattern of the perforations 43, 43, . . . at the position where the attachment 40 is mounted. The "position where the attachment 40 is mounted" may be either the position at which the attachment 40 is placed on the discharged tray 15, or the position at which the attachment 40 is slightly loaded into the seal carving apparatus 100 (first load-in position). This reading means may include, for example, photodiodes 18S that emit light from below the attachment 40, and photodetectors 18D that are disposed above the attachment 40 and opposite to the photodiodes 18S (transmissive photosensor), as illustrated in FIG. 10A. Alternatively, the configuration may have the photodiodes 18S provided above the attachment 40, and the photodetectors 18D provided under the attachment 40. If the number of the dots of a perforation pattern is five, for example, a photosensor including five pairs of photodiodes 18S and photodetectors 18D corresponding to the positions of the perforations 43 and the blanks 44 should be provided. According to the configuration of this transmissive sensor type reading means, the light emitted by the photodiode 18S and passing through the perforation 43 is detected by the photodetector 18D. When the light emitted by the photodiode 18S is blocked by the blank 44, on the other hand, the photodetector 18D do not detect light.

Figure 10B:
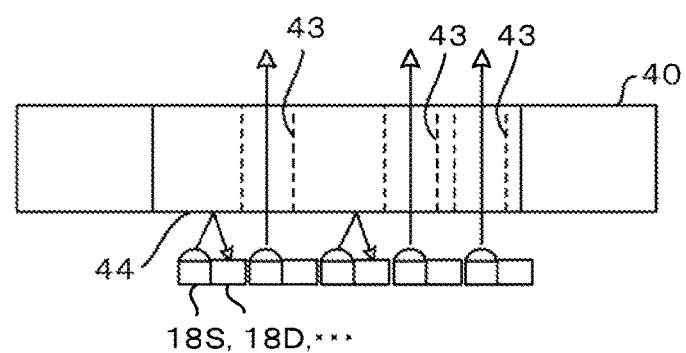
FIG. 10B is a diagram illustrating another embodiment of reading means.

In another embodiment, as illustrated in FIG. 10B, pairs of photodiodes 18S and photodetectors 18D may be provided under the attachment 40 to read the patterns of blanks 44 (reflective photosensor). According to the configuration of this reflective sensor type reading means, the light emitted by the photodiodes 18S and reflected at the top surfaces of the blanks 44 is detected by adjacent photodetectors 18D. When the light emitted by the photodiodes 18S passes through the perforations 43, on the other hand, the adjacent photodetectors 18D do not detect light.

The transmissive or reflective photosensors 18S, 18D can read the dot patterns 43, 44 in a non-contact manner. Accordingly, misalignment or the like of the attachment 40 which would otherwise be caused by an unnecessary contact to read the dot patterns 43, 44 does not occur, so that the accuracy of the relative positional relation between the workpiece and the thermal head 12 can be maintained.

Figure 10C:
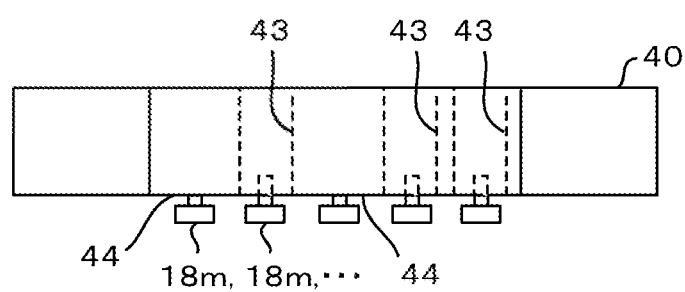
FIG. 10C is a diagram illustrating a further embodiment of the reading means.

In a further embodiment, microswitches 18m, 18m, . . . as illustrated in FIG. 10C may be provided as the reading means to read the pattern of the perforations 43, 43, . . . and the blanks 44, 44, . . . (mechanical switch).

Figure 11:
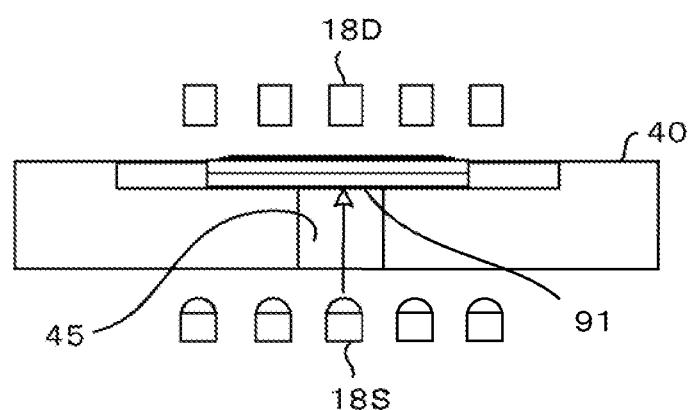
FIG. 11 is a diagram illustrating an embodiment according to which the reading means examines the setting state of a workpiece.

The photosensors 18S, 18D which constitute the above-described reading means included in the seal carving apparatus 100 also serve to examine the setting state of a workpiece on the attachment 40 at the position where the attachment 40 is located at the carving start position or the load-in position. That is, the notch 45 cut away up to part of the pedestal 41 is formed in the body of the attachment 40, so that when the porous impression die 91 as a workpiece is set on the pedestal 41, the notch 45 is blocked by part of the porous impression die 91. As illustrated in FIG. 11, as the photosensors 18S, 18D read the state of the notch 45, the setting state of the porous impression die 91 on the attachment 40 is examined. When the light emitted toward the notch 45 from the photodiodes 18S is blocked by part of the porous impression die 91 so that it is not detected by the photodetectors 18D, it is possible to determine if the workpiece is set properly or not on the attachment 40.

According to this configuration, the reading means (photosensors 18S, 18D) that read the dot patterns 43, 44 of the attachment 40 can also examine the setting state of a workpiece on the attachment 40. Accordingly, even when the attachment 40 is mounted on the seal carving apparatus 100 without a workpiece set on the attachment 40 or even when the attachment 40 is mounted on the seal carving apparatus 100 with a workpiece improperly set on the attachment 40, initiation of the carving process can be prevented. Therefore, it is possible to prevent an improper processing manipulation or the like in advance, enhancing the user's convenience. Moreover, the reading means (photosensors 18S, 18D) serve to perform two functions of reading the dot patterns 43, 44 of the attachment 40 and examining the setting state of a workpiece, so that the general configuration of the seal carving apparatus 100 can be simplified.

Next, a seal carving method using the seal carving apparatus 100 is described in connection to the fabrication of the porous stamp assembly 901 as an example.

Operation the User Performs

First, a user (including a customer) inputs data (monochromatic artwork data) of a seal pattern of a stamp to be created via the terminal device 30. The seal pattern data may be prepared with dedicated software. Further, text data prepared by the user in advance may be input to the terminal device 30. Furthermore, image data read out by a scanner, a camera or the like may be fetched into the terminal device 30. Then, the user inputs the type information on the kind of a workpiece (stamp or label sheet) and the carving size or the like, according to an instruction from dedicated human interface software that runs on the terminal device 30. The monochromatic image data of the seal pattern and the type information on the workpiece which are input are stored in the memory in the terminal device 30.

Next, the user sets the porous impression die 91 on the pedestal 41 of the attachment 40, and places the attachment 40 on the tray 15 discharged from the apparatus 100. When a manipulation of mounting the attachment 40 is performed, the tray 15 is loaded into the seal carving apparatus 100 to retain the attachment 40. Then, after a predetermined initialization process is performed by the seal carving apparatus 100, seal carving process of the porous impression die 91 is automatically carried out.

Figure 12:
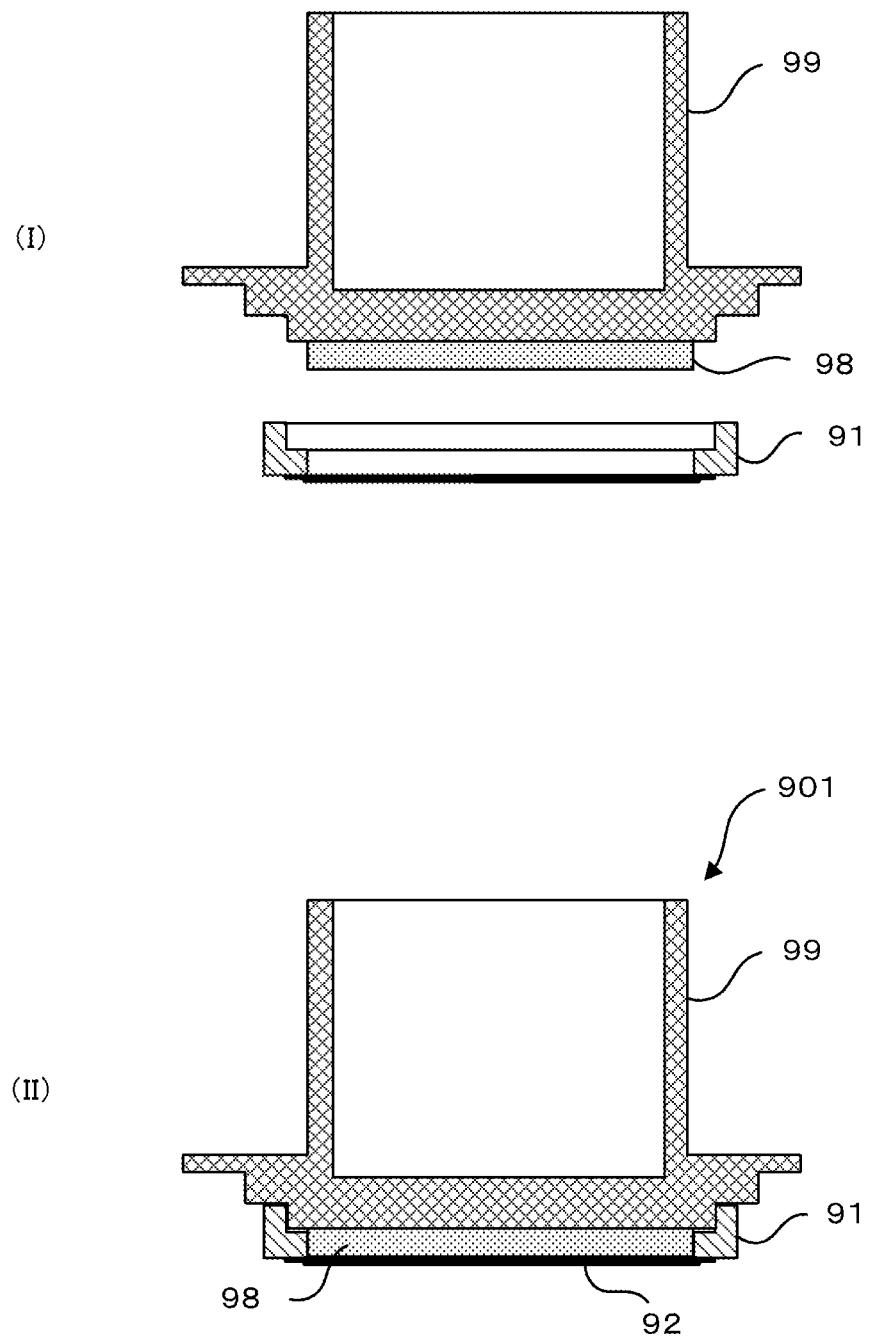
FIG. 12 is a diagram for describing how to assemble a stamp with a porous impression die having a seal formed thereon.

When the seal carving is completed, the tray 15 is automatically discharged. The user can take out the attachment 40 from the tray 15, and obtain the porous impression die 91 with the seal face formed thereon. As illustrated in FIG. 12, attaching the ink impregnated member 98 and the holder 99 to the porous impression die 91 with the seal formed thereon provides the porous stamp assembly 901 that has a unique seal pattern as ordered.

Processing by Seal Carving Apparatus

Figure 13:
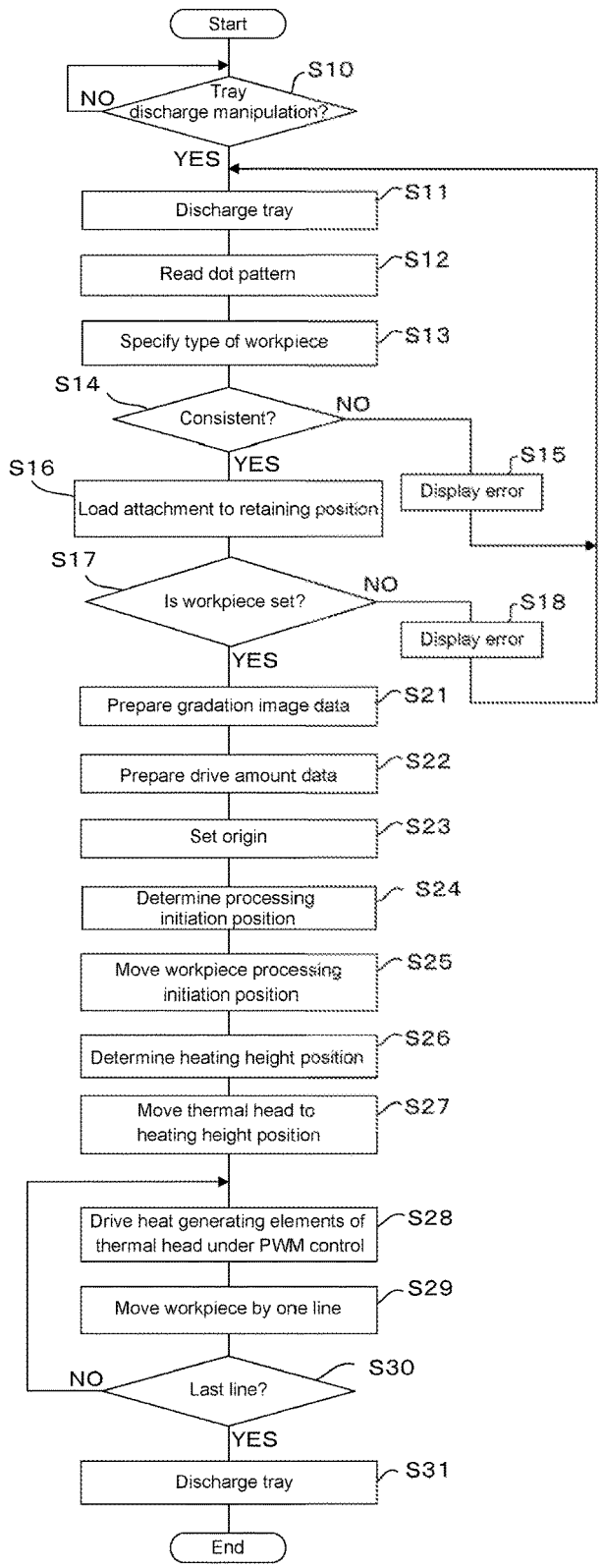
FIG. 13 is a flowchart illustrating seal carving processes in the seal carving apparatus according to the first embodiment.
Figure 14A:
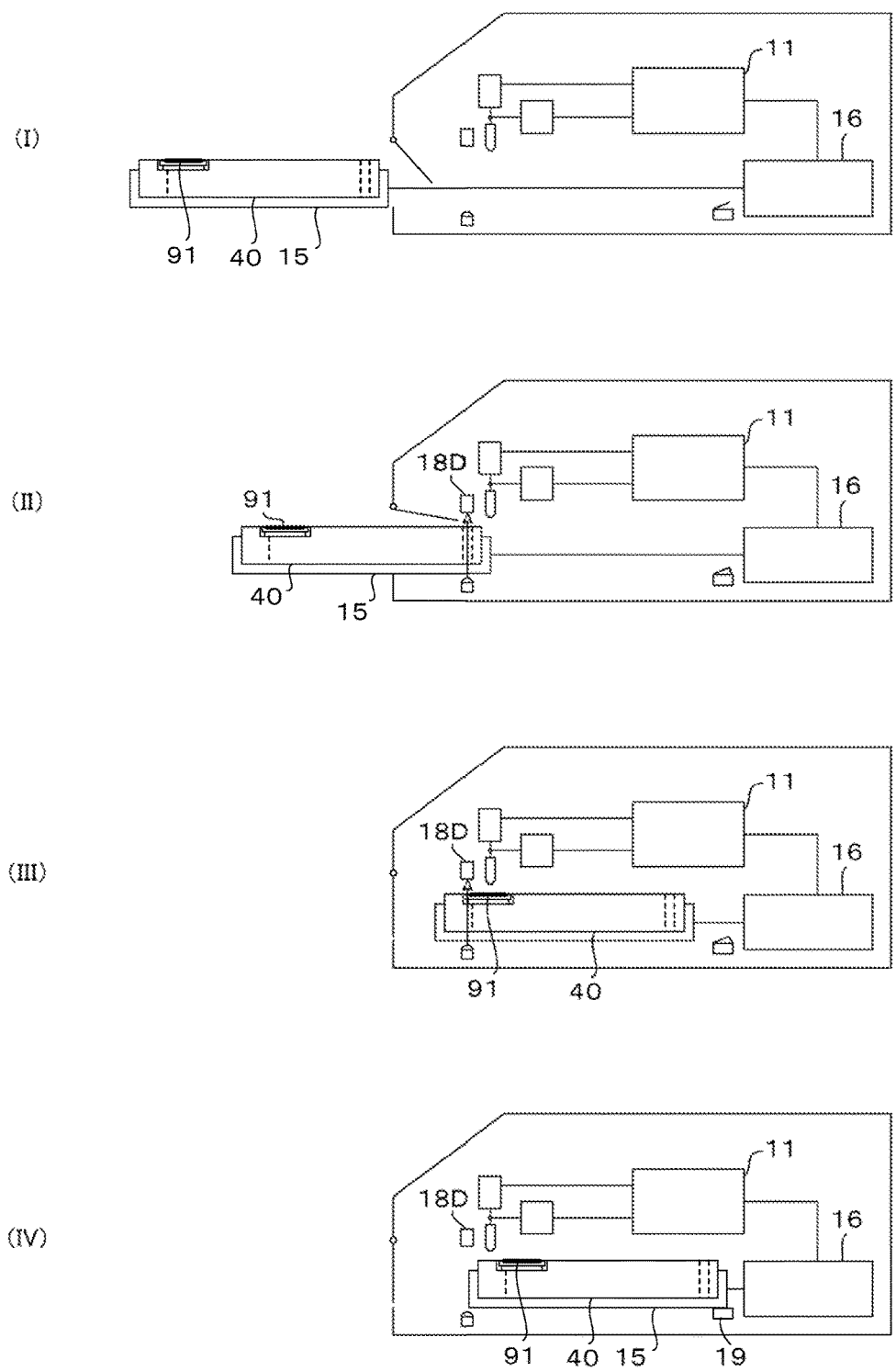
FIG. 14A is a diagram for describing a seal carving operation in the seal carving apparatus according to the first embodiment.
Figure 14B:
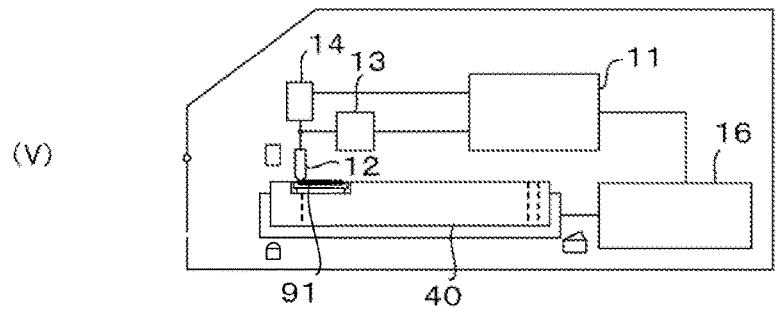
FIG. 14B is a diagram for further describing the seal carving operation in the seal carving apparatus according to the first embodiment.
Figure 14B:
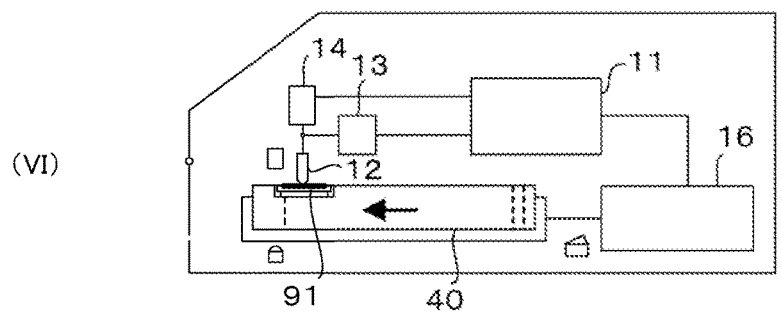
Figure 14B:
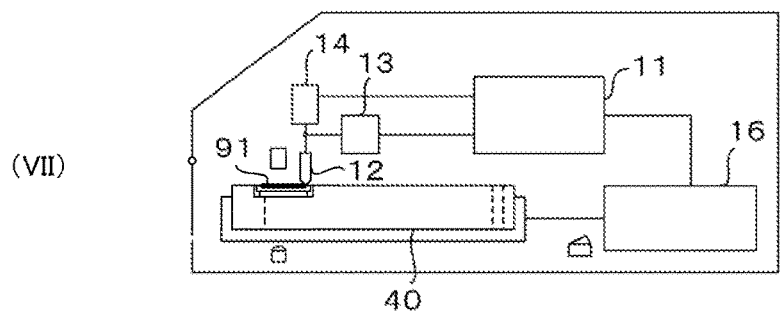

Next, the seal carving operation of the seal carving apparatus 100 is direction referring to FIGS. 13, 14A and 14B. The seal carving operation of the seal carving apparatus 100, which is mainly illustrated in a flowchart of FIG. 13, is achieved as a CPU included in the control device 11 executes an arithmetic operation according to a program stored in memory means such as ROM.

First, when a manipulation of discharging the tray 15 is accepted (step S10: YES), loading control means included in the control device 11 controls the loading mechanism 16 to load the tray 15 to the discharge position in next step S11. Then, the user mounts the attachment 40 on the tray 15 (FIG.

14A(I)). The loading control means loads the tray 15 to the first load-in position according to the manipulation of loading the tray 15 inside (FIG. 14A(II)), and the photosensors 18S, 18D read the dot pattern of the perforations 43, 43, . . . formed in the attachment 40 (step S12). The dot pattern of the perforations 43, 43, . . . may be read at the position where the attachment 40 is mounted on the tray 15 or a position at which the attachment 40 is retained further inside (e.g., an origin position to be described later or in the vicinity thereof).

In subsequent step S13, the control device 11 identifies the type of the mounted attachment 40 and the type (kind and carving size) of the workpiece set on the attachment 40 based on the read dot pattern. The identified type information of the workpiece may be displayed on the display part 18 of the seal carving apparatus 100. In step S14, consistency between the type information on the workpiece input to the terminal device 30 and the type of the attachment 40 and/or the type information on the workpiece, both identified from the dot pattern of the attachment 40, is determined. When those information are not consistent with each other (step S14: NO), an error may be displayed on the display part 18 in step S15, and retaining of the attachment 40 may be refused. In this way, the reading means (photosensors 18S, 18D) can read the dot pattern to identify the type of a workpiece at the time the attachment 40 is mounted, which is prior to the initiation of carving. This makes it possible to prevent an improper processing manipulation or the like.

When it is determined that the type information are consistent with each other (step S14: YES), in step S16, the loading control means controls the loading mechanism 16 to load the tray 15 and the attachment 40 to a second load-in position where further inside the seal carving apparatus 100. The process of identifying the type of the workpiece based on the dot pattern in step S13, and the process of determining the consistency of the type information in step S14 may be performed at the origin position to be described later or in the vicinity thereof. In this case, when there is not the consistency of the type information, the tray 15 may be returned to the discharge position. This can prompt the user to redo the manipulation.

In step S17, the tray 15 and the attachment 40 are located in the seal carving apparatus 100, and the photodetectors 18D as the reading means examine the setting state of the porous impression die 91 or the workpiece on the attachment 40 (FIG. 14A(III)). When the porous impression die 91 is not set on the attachment 40 or is not properly set thereon (step S17: NO), an error is displayed on the display part 18 in step S18, and the tray 15 is returned to the discharge position. This can prompt the user to set the workpiece on the attachment 40.

When it is determined that the porous impression die 91 is properly set on the attachment 40 (step S17: YES), in next step S21, the gradation correction means prepares gradation image data from monochromatic image data. For example, the gradation correction means prepares gradation image data corrected in such a way that the pixel value monotonously changes stepwise in the boundary region where the value of the monochromatic image data for white/black is reversed. In step S22, the driving amount conversion means converts the gradation image data to prepare driving amount data for the individual heat generating elements 12a.

In step S21, the gradation correction means may prepare gradation image data from monochromatic image data in view of a non-linear correlation between the driving amount of the heat generating elements which has been measured beforehand, and the ink permeability. In step S22, the driving amount conversion means may prepare driving amount data from gradation image data in view of the non-linear correlation.

In next step S23, the tray 15 and the attachment 40 are loaded to the deepest position (third load-in position; origin position), at which an origin sensor 19 is turned ON, thereby setting the origin of the loading (FIG. 14A(IV)). As the origin sensor 19, a photosensor that senses blocking of light when the tray 15 or the attachment 40 contacts the photosensor can be used. The origin may be set at the position where the tray 15 and the attachment 40 are discharged outside as illustrated in FIG. 14A(I) (discharge position). In next step S24, the control device 11 determines a carving start position based on the type of the workpiece and the information on the carving size which are identified from the dot pattern of the perforations 43. In step S25, the loading control means controls the loading mechanism 16 to move the porous impression die 91 to the determined carving start position.

After the porous impression die 91 of the workpiece is reached to the carving start position, the control device 11 determines the heating height position of the thermal head 12 based on the kind of the workpiece identified from the dot pattern of the perforations 43 in step S26. The "heating height position" corresponds to the height position at which the thermal head 12 abuts on the porous impression die 91. In step S27, the control device 11 controls the elevation mechanism 14 to move the thermal head 12 downward to the determined heating height position. At this stage, the thermal head 12 abuts on the porous impression die 91 located at the carving start position (FIG. 14B(V)).

In step S28, the thermal drive control means performs PWM controls on the thermal drive means 13 according to one line of driving amount data to selectively and thermally drive the heat generating elements 12a on the thermal head 12. Accordingly, the porous impression die 91 is thermally carved by one line. In next step S29, the loading control means controls the loading mechanism 16 to move the porous impression die 91 by a one-line width in the load-out direction. The control device 11 performs seal carving line by line, repeating the processes of steps S28 and S29 (FIG. 14B(VI)). When completion of the processing of the last end line is decided in step S30 (FIG. 14B(VII)), the tray 15 is loaded to the discharge position in step S31. Accordingly, the user can acquire the porous impression die 91 with the seal pattern formed thereon.

Figure 15:
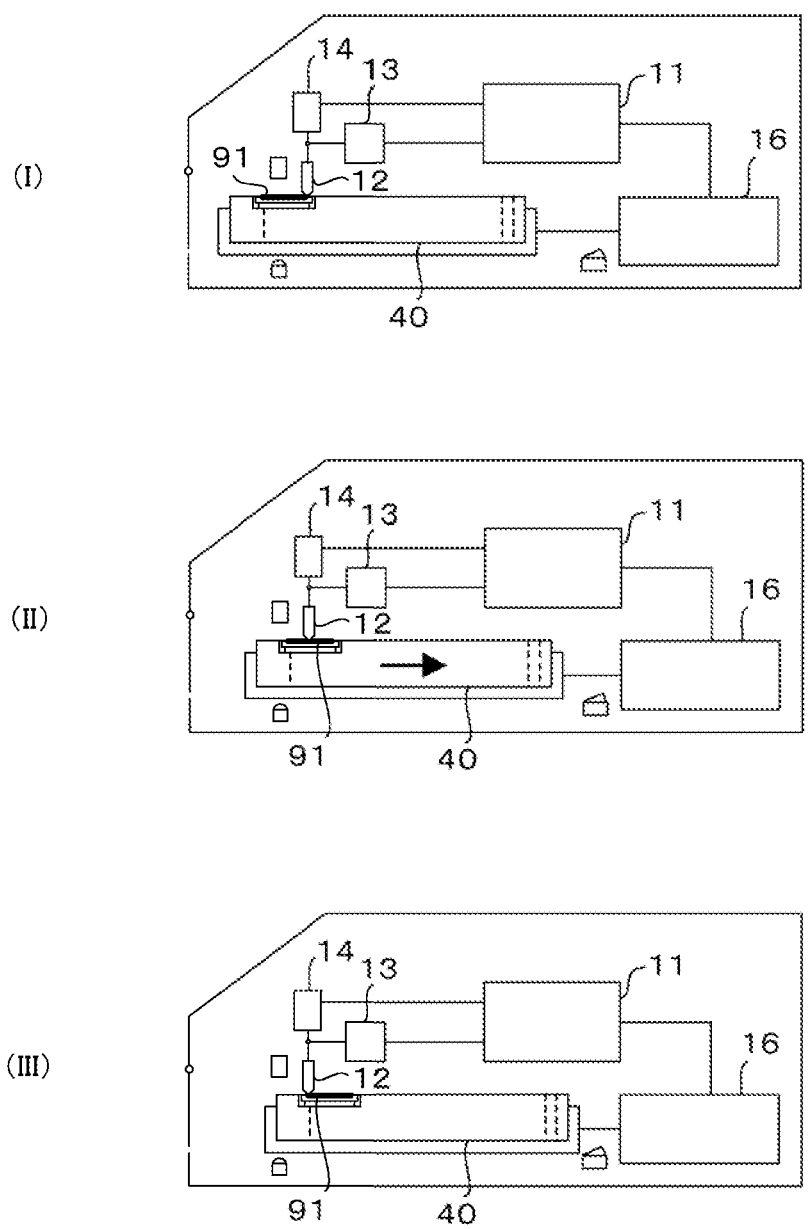
FIG. 15 is a diagram for describing a seal carving operation according to another embodiment.

As illustrated in FIG. 15, the seal carving process may be carried out while moving the porous impression die 91 in the load-in direction. That is, the control device 11 determines the carving start position (at the right end in FIG. 15) after setting the origin, and controls the loading mechanism 16 to move the porous impression die 91 to the determined carving start position (FIG. 15(I)). Then, the control device 11 performs PWM control to thermally drive the heat generating elements 12a on the thermal head 12 while controlling the loading mechanism 16 to move the porous impression die 91 line by line in the load-in direction (FIG. 15(II)). Upon completion of the processing of the last end line (the left end in FIG. 15) of the porous impression die 91, the seal carving is completed (FIG. 15(III)).

The seal carving apparatus 100 according to the first embodiment can identify the type of the workpiece set on the attachment 40 based on the dot patterns or the combination of the perforations 43 and the blanks 44 on the mounted attachment 40. Even when a wrong attachment of a type different from the kind or size of the workpiece which the customer has ordered is mounted into the seal carving apparatus by mistake, for example, initiation of the carving process can be prevented. This makes it possible to prevent an improper processing manipulation or the like. Therefore, the seal carving apparatus 100 can have both enhanced general versatility and convenience.

2. Second Embodiment

A thermal carving machine 110 as a seal carving apparatus according to a second embodiment is described referring to FIGS. 16 to 30.

Figure 16:
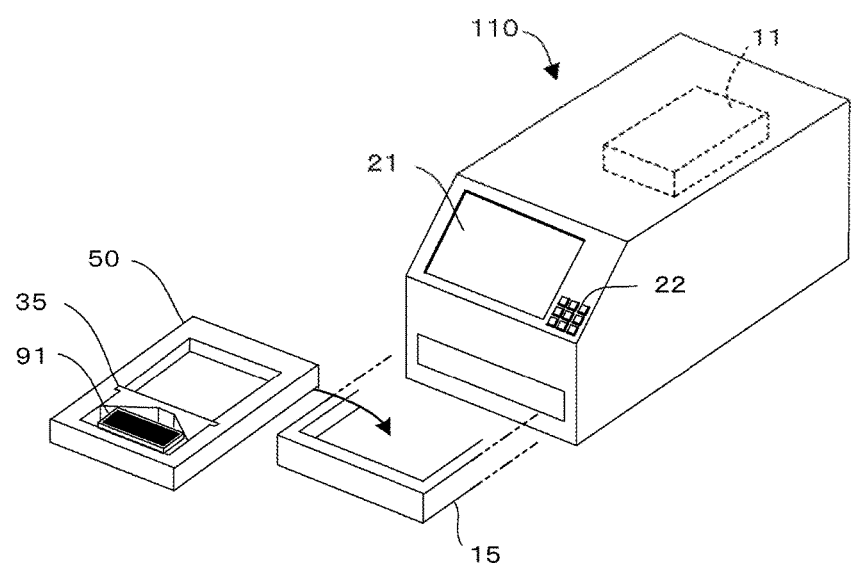
FIG. 16 is an external view of a thermal carving machine according to the second embodiment.
Figure 17:
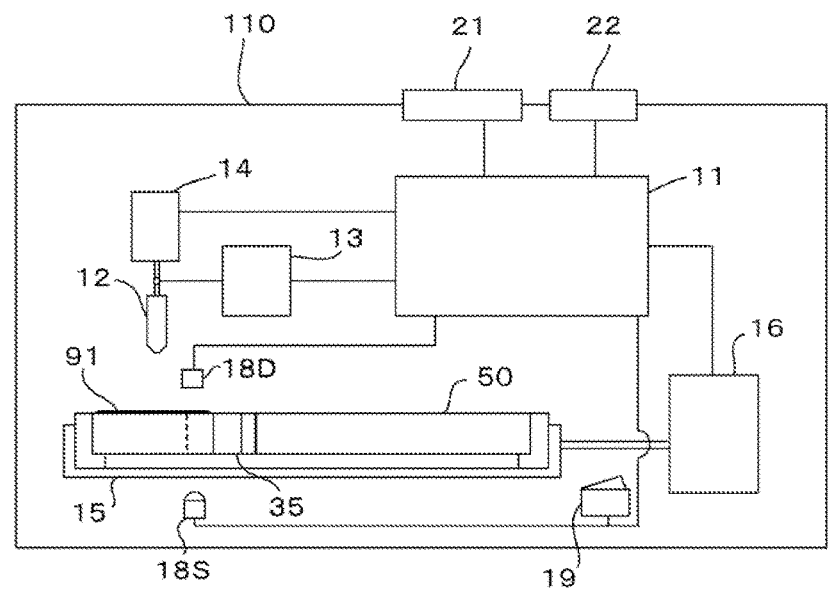
FIG. 17 is a block diagram illustrating the schematic configuration of the thermal carving machine of FIG. 16.

FIG. 16 is an external view of the thermal carving machine 110. FIG. 17 is a block diagram illustrating the schematic configuration of the thermal carving machine 110.

As illustrated in FIG. 16, a touch panel 21, ten keys 22, etc. for a user to operate the thermal carving machine 110 are provided on the front surface portion of the thermal carving machine 110. For example, a manipulation input screen for the thermal carving machine 110, and characters or the like indicating the operational state of the apparatus (completion of preparation, mounting of the attachment, reading data, printing, discharge of the attachment, an error, etc.), or information on the type of the workpiece (kind and carving size) currently set is displayed on the touch panel 21. A communication connector for connection to a network such as Ethernet (registered trademark), a power supply connector, and the like, though not illustrated, are provided on the rear surface portion of the thermal carving machine 110.

In the thermal carving machine 110, an unillustrated external personal computer (PC) or dedicated terminal device may have a human interface function for manipulation inputs or displaying and the like, or may operate some parts of the processes instead of the internal control device 11.

As illustrated in FIG. 17, the control device 11 is connected with, in addition to the aforementioned touch panel 21 and ten keys 22, thermal drive means 13 that thermally drives a thermal head 12, an elevation mechanism 14 that moves up and down the thermal head 12, a loading mechanism 16 that loads a tray 15 and an attachment 50 in/out, a read sensor 18S, 18D that reads a workpiece (porous impression die 91) to be set on the attachment 50 and an adapter member 35 to be described later, and the like.

Figure 19:
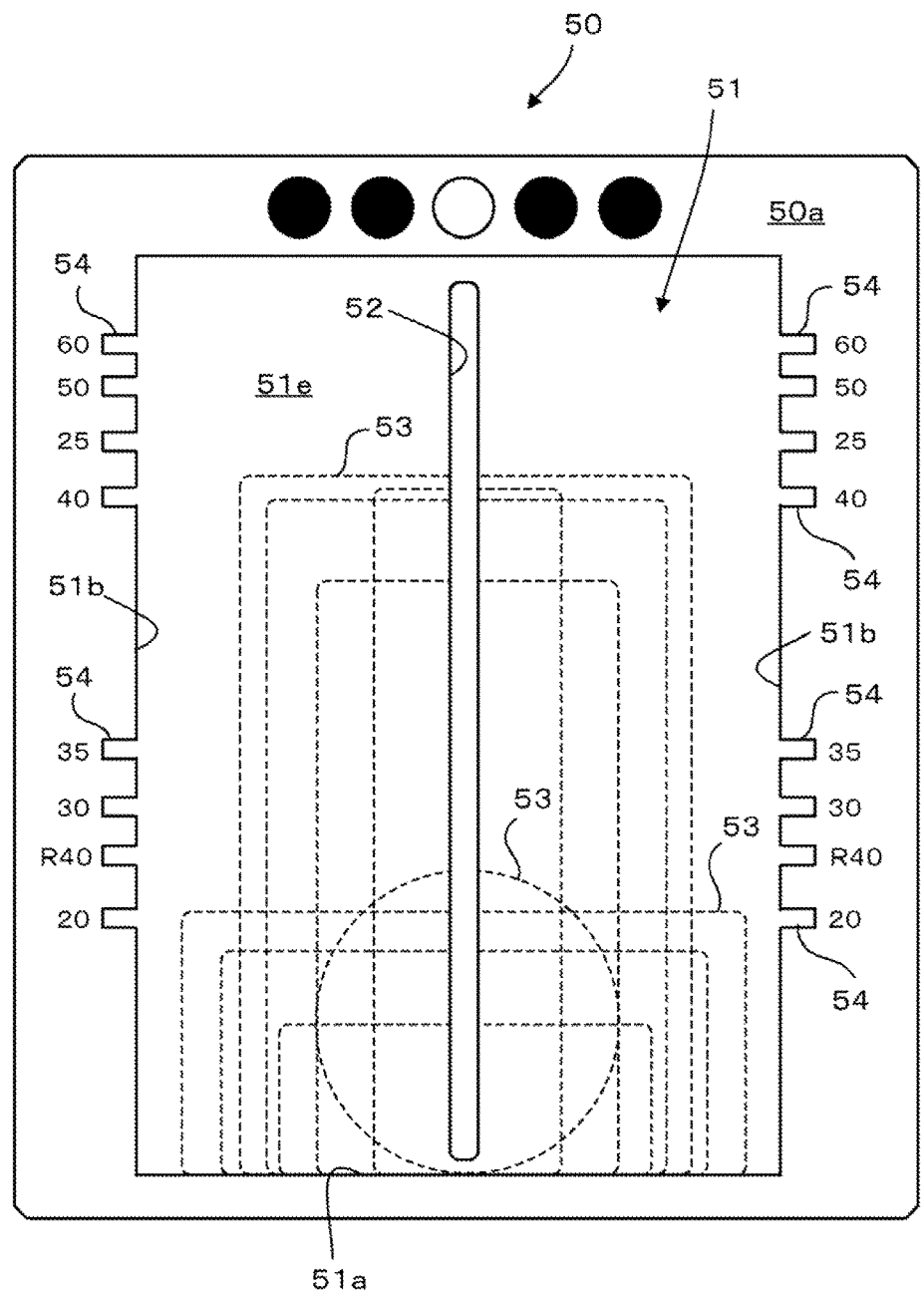
FIG. 19 is a plan view of an attachment according to the second embodiment.

The porous impression die 91 which is a seal member of a porous stamp is set on the dedicated attachment 50 as illustrated in, for example, FIG. 19. The thermal carving machine 110 includes the tray 15 which is means for loading the attachment 50 mounted on the tray 15. The loading mechanism 16 is configured to reciprocally load the porous impression die 91 and the attachment 50 between the discharge position where attachment/detachment is enabled, and an internal retaining position. The loading mechanism 16 is also means for relatively moving the porous impression die 91 and the thermal head 12 in abutment with each other.

Figure 18:
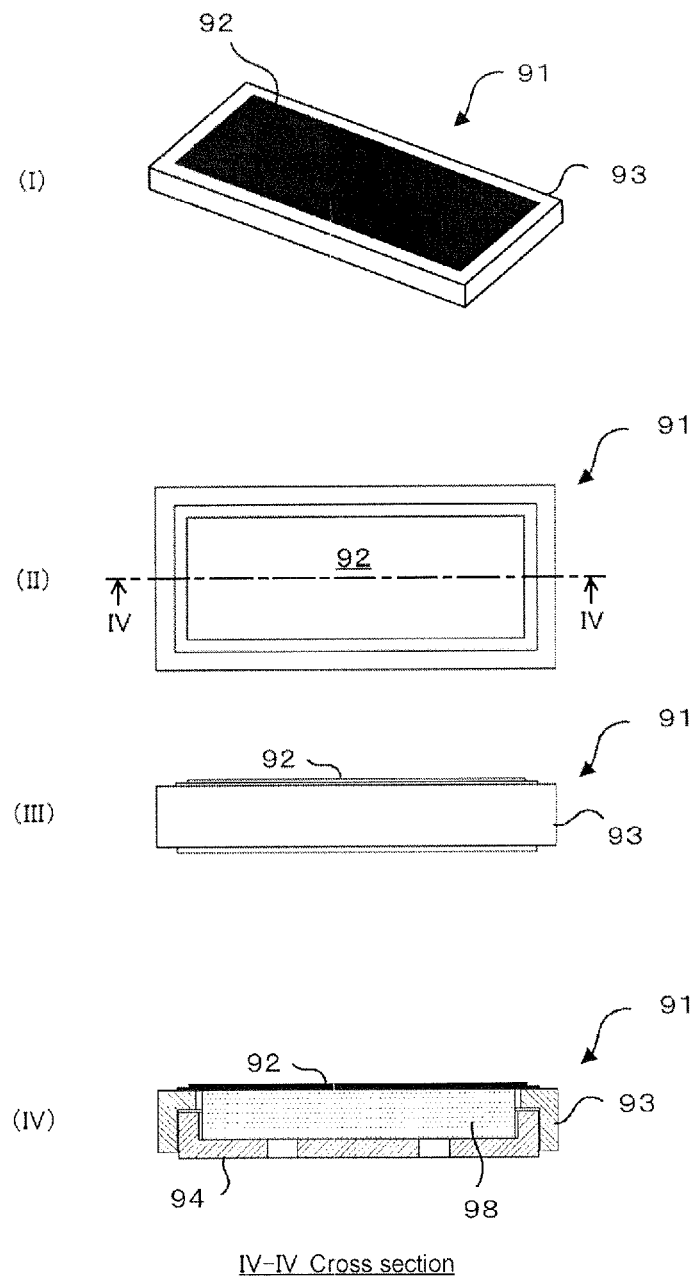
FIG. 18 provides an external perspective view, a plan view, a side view and a cross-sectional view of a rectangular type porous impression die which is an example of a workpiece according to the second embodiment.

FIG. 18(I) is an external perspective view of a rectangular type of porous impression die 91 as an example of a workpiece. (II) and (III) in FIG. 18 are a plan view and a side view of the porous impression die 91. FIG. 18(IV) is a cross-sectional view of the porous impression die 91 along IV-IV. As illustrated in those diagrams, the rectangular type of die 91 includes a rectangular enclosing frame 93 with a porous film 92 adhered thereto, an ink impregnated member 98 to be mounted inside the frame 93, and a mount member 94 that is attached to the bottom side of the frame 93 to hold the ink impregnated member 98 in order to make the seal stable.

Next, an attachment 50 to be mounted on the thermal carving machine 110 is described. Porous impression dies 91 which are various types of workpieces are set on the attachment 50 via the adapter member 35. FIG. 19 is a plan view of the attachment 50 according to the second embodiment of the invention. A die setting part 51 having a flat setting surface 51e is formed on the body of the attachment 50 of FIG. 19 at a low-dented position with respect to a top surface 50a. The die setting part 51 is formed as a planar rectangular parallelepiped groove having a reference wall surface 51a and side wall surfaces 51b, 51b.

The loading direction of the attachment 50 according to the second embodiment is the upward/downward direction in FIG. 19. Particularly, the upward direction in FIG. 19 sometimes refers to "load-in direction" in which the attachment 50 moves toward the interior of the thermal carving machine 110, and particularly, the downward direction in FIG. 19 sometimes refers to "load-out direction" in which the attachment 50 moves outward from the thermal carving machine 110.

Herein, the "widthwise direction" refers to a direction orthogonal to the loading direction. Referring to FIG. 19, the reference wall surface 51a of the die setting part 51 is orthogonal to the loading direction (i.e., the normal line of the reference wall surface 51a coincides with a straight line in the loading direction). Each side wall surface 51b and the reference wall surface 51a are formed to be orthogonal to each other.

A slit hole 52 extending in the loading direction is formed in the setting surface 51e of the die setting part 51 at a widthwise center position. A read sensor 18S, 18D which is a transmissive photosensor examines the position of the adapter member 35 and the setting state of the workpiece (porous impression die 91), the details of which will be described later. The type of the porous impression die 91 set on the attachment 50 is identified based on the relative position of the adapter member 35 on the attachment 50. Broken lines 53, 53, . . . which trace the outlines of processable workpieces may be printed on the setting surface 51e to give indications for setting of different types of workpieces.

Further, a plurality of fitted grooves 54, 54 into which both ends of the adapter member 35 to be described next are fitted to be positioned are formed in the side wall surfaces 51b, 51b of the die setting part 51. Furthermore, type codes indicative of the types of workpieces corresponding to the associated fitted grooves 54 may be printed close to the fitted grooves 54, respectively. This allows the adapter member 35 to be fixed at a predetermined position of the attachment 50, and gives at-a-glance indication of in which fitted groove 54 the adapter member 35 should be fitted, thus enhancing the convenience.

Figure 20A:
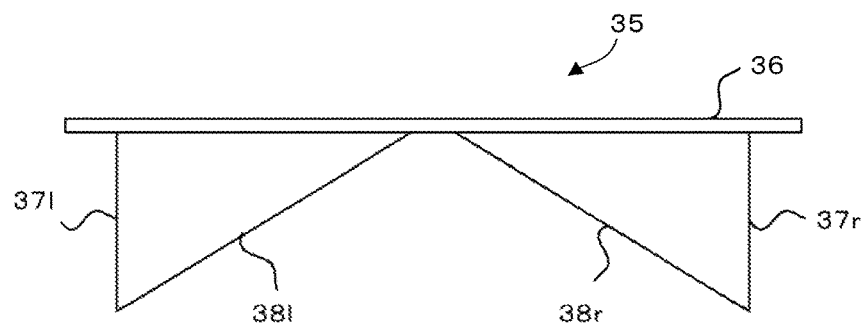
FIG. 20A provides a plan view illustrating an adapter member to be used in the attachment of FIG. 19.
Figure 20B:
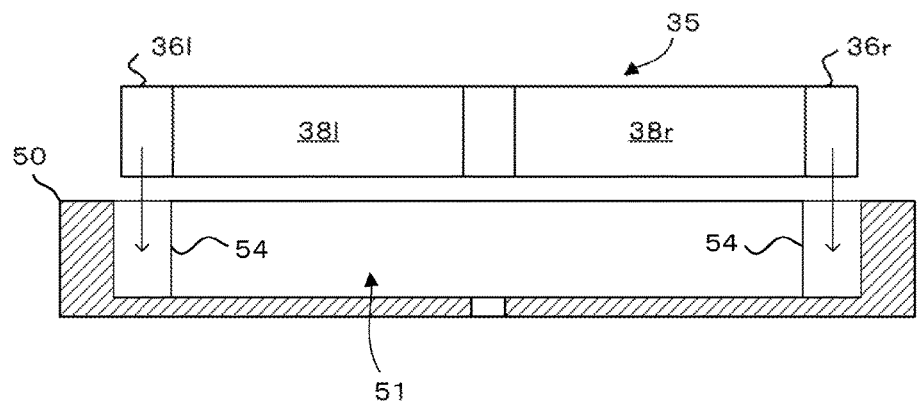
FIG. 20B is a side view illustrating the adapter member to be used in the attachment of FIG. 19.

FIG. 20A provides a plan view of the adapter member 35. FIG. 20B is a side view of the adapter member 35 illustrating the cross section of the attachment 50. As illustrated in FIG. 20A, the adapter member 35 has a flange part 36 and triangular left and right holding parts 37*l*, 37*r* symmetrical to each other and connected to one surface of the flange part 36, the flange part 36 and the holding parts 37*l*, 37*r* being formed integrally. The holding parts 37*l*, 37*r* respectively have abutment surfaces 38*l*, 38*r* which are inclined toward the widthwise center of the attachment 50 so as to gradually narrow the distance therebetween. The flange part 36 has a length corresponding to the distance between the two fitted grooves 54, 54 facing each other in the widthwise direction. As illustrated in FIG. 20B, the adapter member 35 is set on the attachment 50 at a predetermined position as both end portions 36*l*, 36*r* of the flange part 36 are fitted in any pair of the fitted grooves 54, 54 on both widthwise sides of the die setting part 51.

Figure 21:
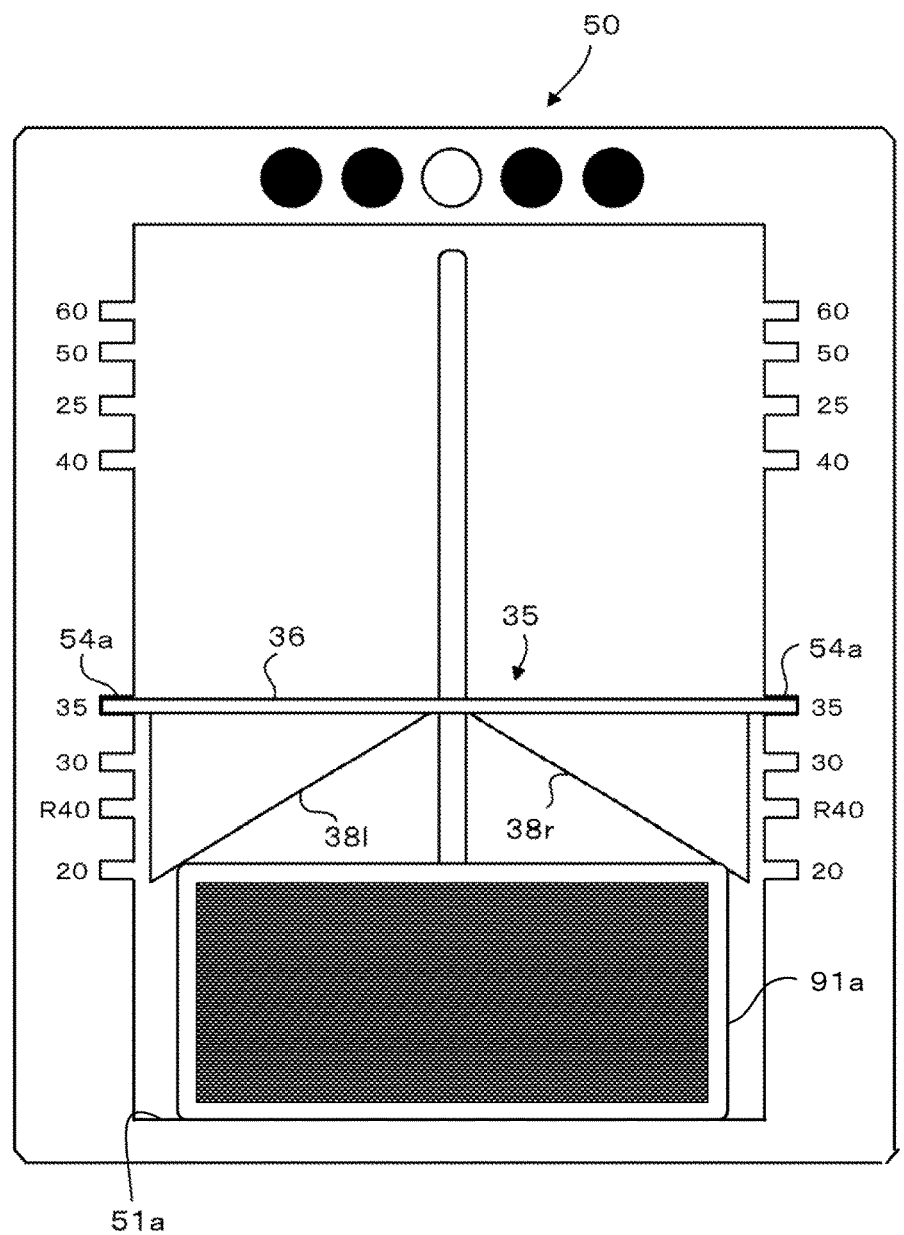
FIG. 21 is a plan view illustrating an example where a porous impression die is set on the attachment of FIG. 19.

FIG. 21 illustrates an example where a rectangular porous impression die 91*a* with a size of 35×70 mm is set on the attachment 50. As illustrated in FIG. 21, both ends of the flange part 36 of the adapter member 35 are fitted in fitted grooves 54*a*, 54*a* with a type code "35" printed thereon. Accordingly, the porous impression die 91*a* is held between the reference wall surface 51*a* formed on the attachment 50 and the two inclined abutment surfaces 38*l*, 38*r* of the adapter member 35.

Figure 22:
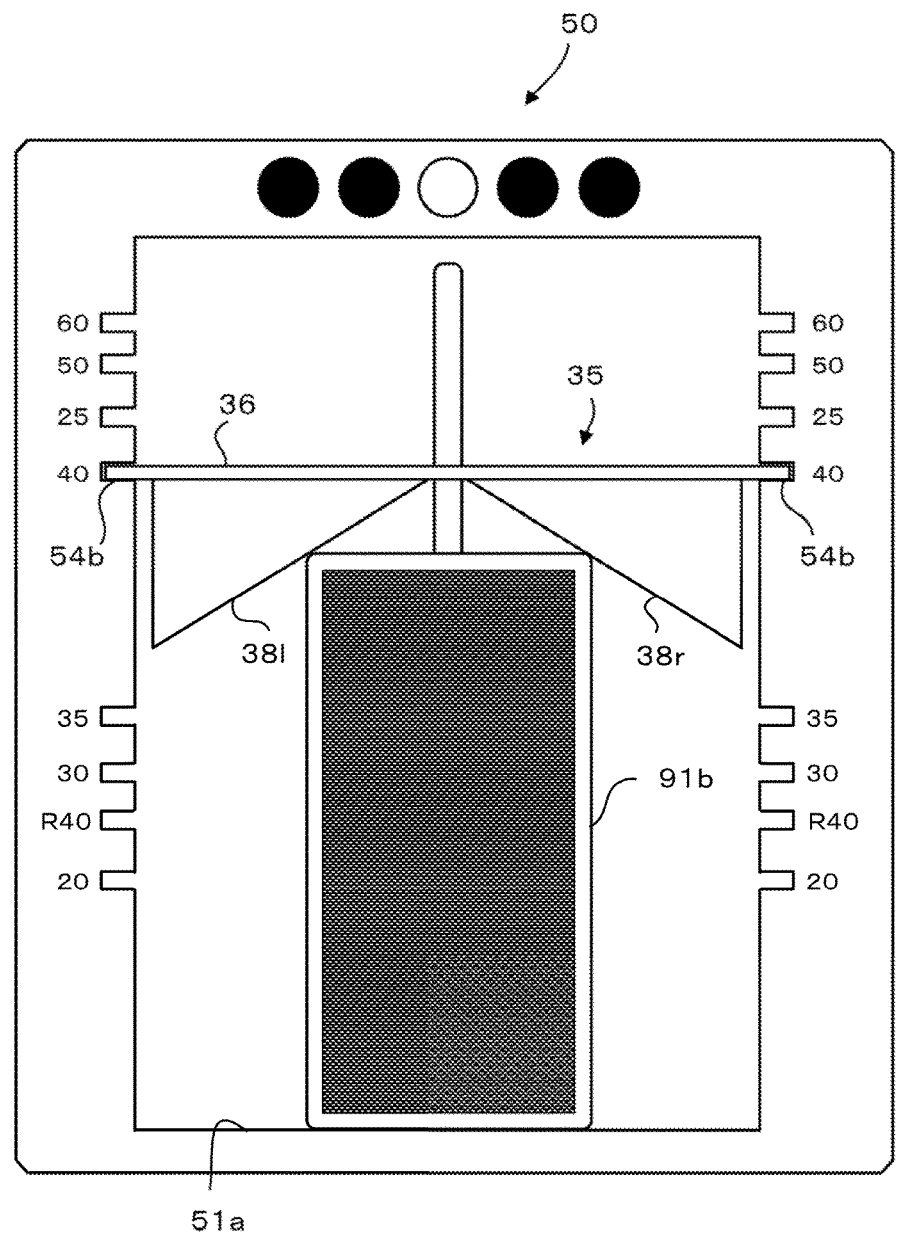
FIG. 22 is a plan view illustrating an example where another porous impression die is set on the attachment of FIG. 19.
Figure 23:
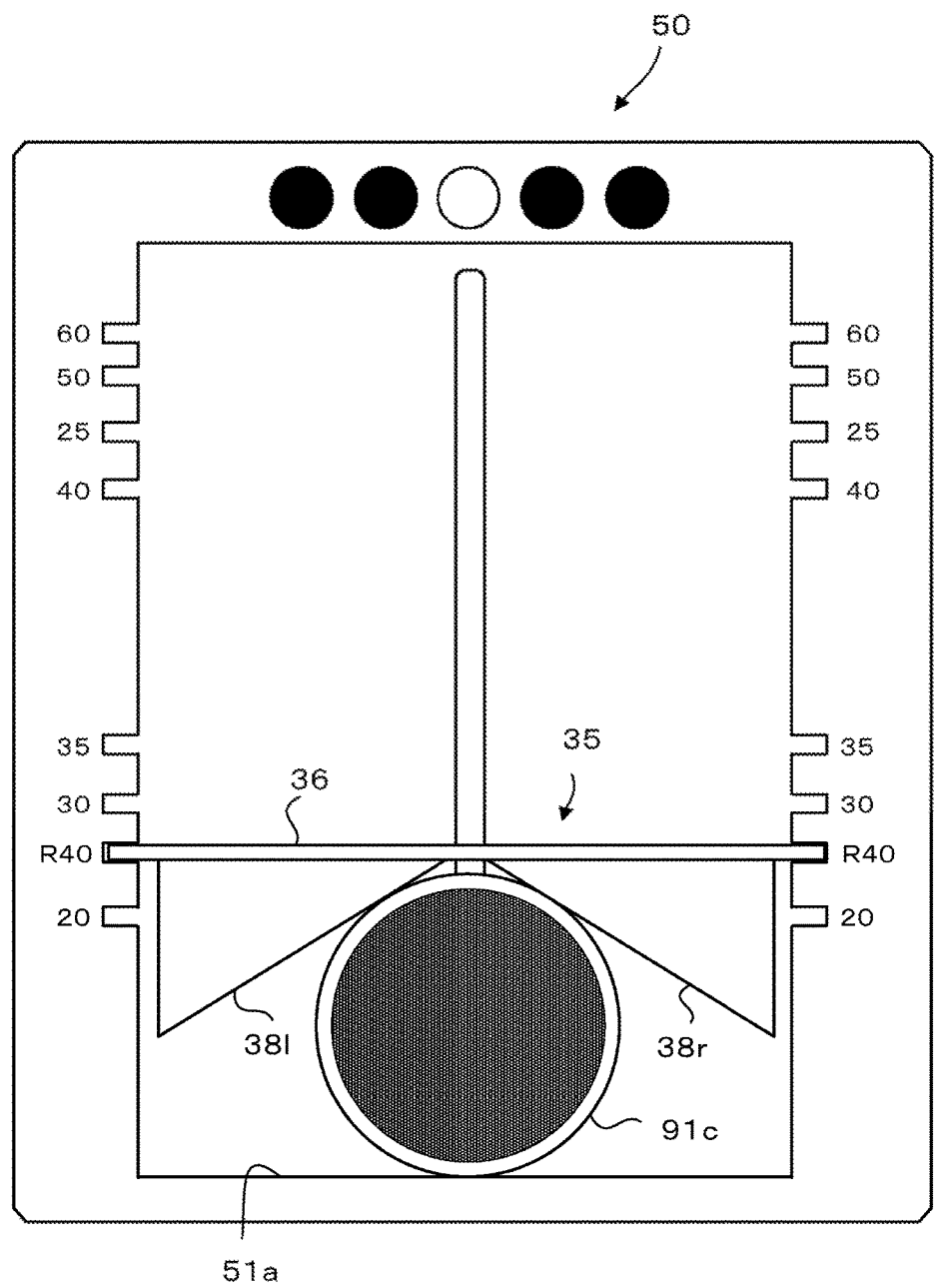
FIG. 23 is a plan view illustrating an example where a further porous impression die is set on the attachment of FIG. 19.
Figure 24:
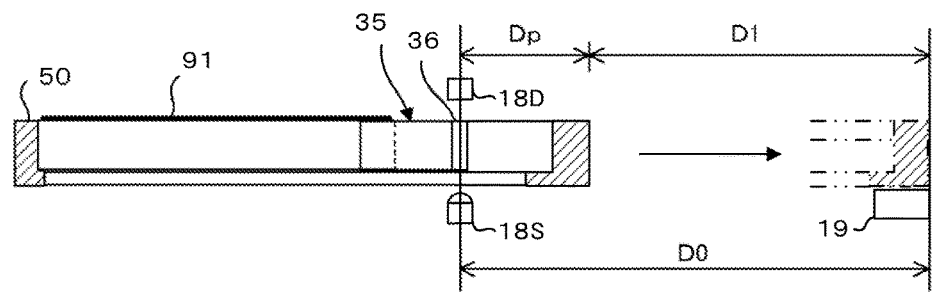
FIG. 24 is a diagram for describing an example where the type of a workpiece is identified based on the relative position of the adapter member on the attachment of FIG. 19.

FIG. 22 illustrates an example where a rectangular porous impression die 91*b* with a size of 40×80 mm is set on the attachment 50. FIG. 23 illustrates an example where a round porous impression die 91*c* with a diameter of 40 mm is set on the attachment 50. As apparent from the examples of FIGS. 21 to 23, different types of workpieces may be setting on the die setting part 51 of the attachment 50 at positions and in directions which are predetermined according to the types of the workpieces (see, for example, broken lines 53 illustrated in FIG. 19).

Accordingly, various types (kinds, sizes) of porous impression dies 91 of can be coped with using the one same attachment 50 without replacing the attachment. Therefore, the general versatility of the thermal carving machine 110 is enhanced.

Further, the adapter member 35 has two abutment surfaces 38*l*, 38*r* inclined toward the widthwise center of the attachment 50 so as to gradually narrow the distance therebetween. Uniform abutment of the two symmetrical abutment surfaces 38*l*, 38*r* on the two corners of the porous impression die 91 enhances the stability of holding the porous impression die 91. In addition, the adapter member 35 can be formed compact.

The types (kinds and sizes) of workpieces whose outside dimensions are stylized, and the fitting positions (fitted grooves 54, 54, . . . ) of the adapter member 35 for holding the workpieces have a one-to-one relation, and detection of the fitting position of the adapter member 35 permits the types (rectangular type, round type or the like), the carving sizes, the carving start positions, the heating height positions, etc. to be identified in addition to the outside dimensions of the stylized workpieces.

Workpiece identifying means included in the control device 11 identifies the type of a workpiece based on the relative position of the adapter member 35 on the attachment 50. As exemplified in FIG. 24, a distance D0 between the read sensor 18S, 18D and the origin sensor 19 in the loading direction of the attachment 50 is fixed. In the process of loading the attachment 50 toward the origin, the workpiece identifying means measures a loading distance D1 from a position where the flange part 36 of the adapter member 35 is detected by the read sensor 18S, 18D and a position where an end portion of the tray 15 or the attachment 50 is detected by the origin sensor 19, and calculates a difference D0-D1 between those distances so that a relative position Dp of the adapter member 35 on the attachment 50 can be obtained.

It is preferable that the read sensor should be a transmissive photosensor including a pair of photodiode 18S and photodetector 18D. In other words, as the light emitted from the photodiode 18S is blocked by the flange part 36 of the adapter member 35 so that the photodetector 18D do not sense the light, the adapter member 35 is detected. Further, the read sensor may be a reflective photosensor that senses reflection of light at the flange part 36. As the transmissive or reflective photosensor detects the relative position of the adapter member 35 in a non-contact manner, misalignment or the like of the attachment 50 which would otherwise be caused by an unnecessary contact does not occur, so that the accuracy of the relative positional relation between the workpiece and the thermal head 12 can be maintained.

As to the origin sensor 19, a mechanical sensor that is set on as an end portion of the tray 15 contacts the sensor, or a photosensor that senses blocking or reflection of light by or at the end portion may be used.

FIG. 25 exemplifies the relation between the type of a workpiece and the fitting position (relative position Dp) of the adapter member 35. As exemplified in FIG. 25, the relation between the type of the workpiece and the relative position Dp of the adapter member 35 correspond in one to one to each other. In the process of loading the attachment 50 toward the origin, the workpiece identifying means can uniquely identify the type (kind and carving size) of the currently set workpiece based on the relative position Dp by detecting the fitting position of the adapter member 35.

Figure 26:
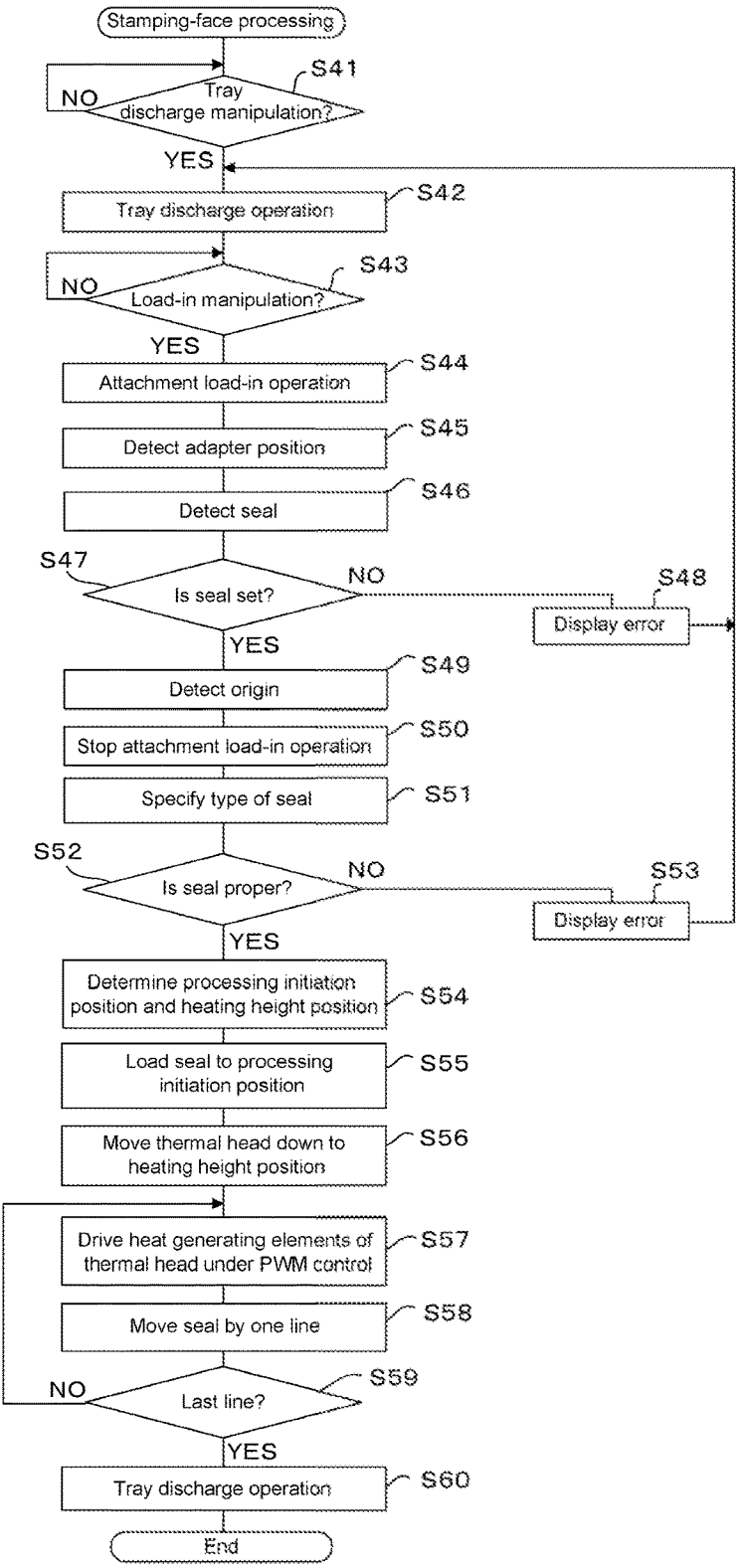
FIG. 26 is a flowchart exemplifying seal carving processes in the thermal carving machine according to the second embodiment.
Figure 27:
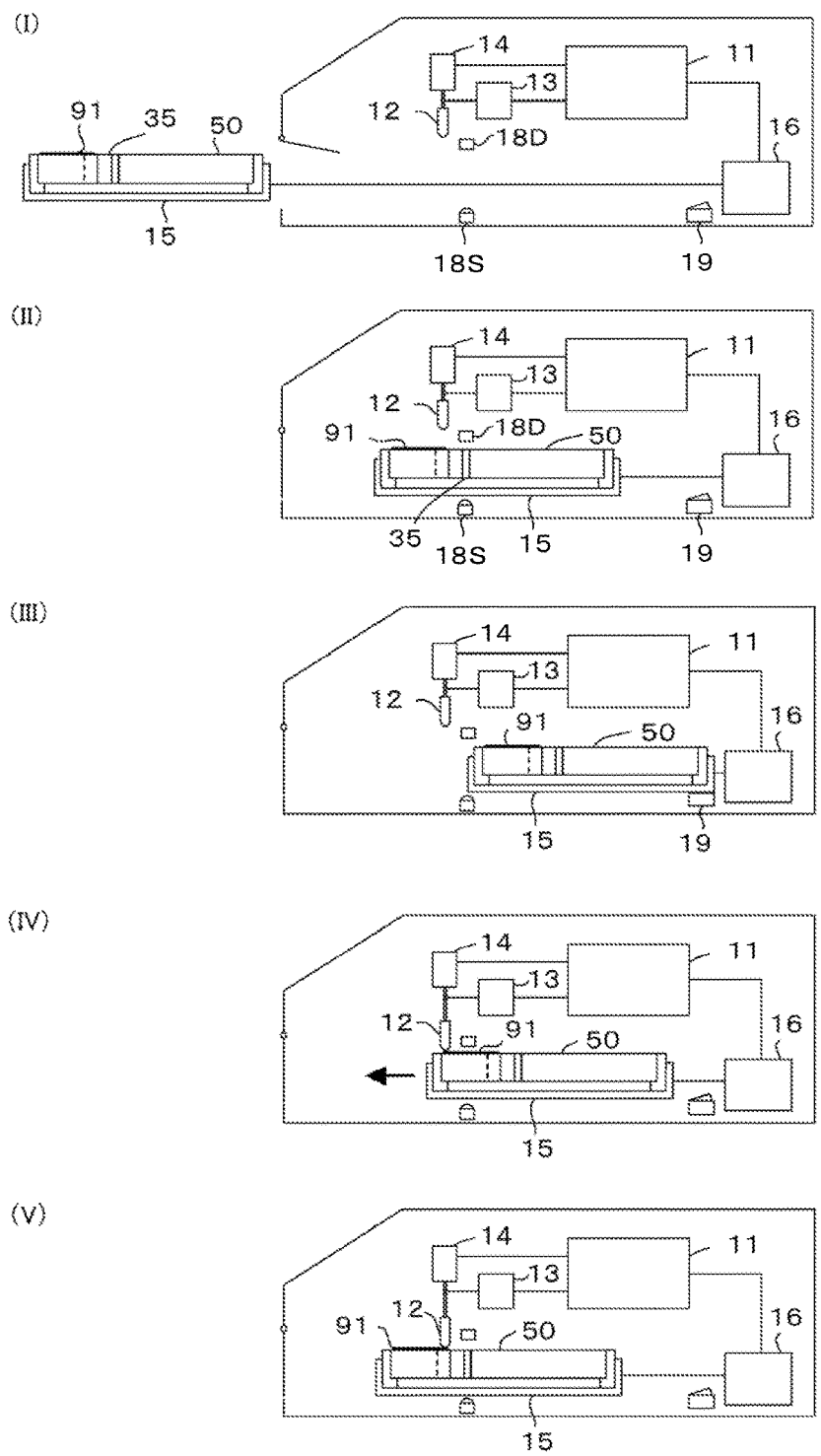
FIG. 27 is a diagram for describing a seal carving operation in the thermal carving machine according to the second embodiment.

Next, seal carving process which is carried out by carving control means included in the control device 11 is described. FIG. 26 is a flowchart exemplifying seal carving processes which is performed by the carving control means. FIG. 27 is a diagram for describing the seal carving operation of the thermal carving machine 110. The carving control means includes loading control means, elevation control means and thermal drive control means which will be described next.

First, a user (including a person who has ordered a stamp or a sales person) sets the porous impression die 91 to be subjected to seal carving at a predetermined position of the attachment 50, and sets the porous impression die 91 on the attachment 50 via the adapter member 35. When a manipulation of discharging the tray 15 is performed through the touch panel 21 or the like (step S41), the loading control means controls the loading mechanism 16 to load the tray 15 to the discharge position shown in FIG. 27(I) (step S42). Then, the user mounts the attachment 50 with the porous impression die 91 set thereon on the discharged tray 15. The user may set the porous impression die 91 and the adapter member 35 on the attachment 50 after mounting the attachment 50 on the tray 15, or may set the porous impression die 91 and the adapter member 35 on the attachment 50 which has already been mounted on the tray 15.

When the load-in manipulation is performed via the touch panel 21 or the like (step S43), the loading control means controls the loading mechanism 16 to start the loading of the attachment 50 inside (step S44). In the process of loading the attachment 50 toward the origin, the read sensor 18S, 18D detects the adapter member 35 (specifically, the flange part 36) at the load-in position shown in, for example, FIG. 27(II) (step S45).

In next step S46, the read sensor 18S, 18D examines the setting state of the porous impression die 91 onto the attachment 50. When the porous impression die 91 is not set on the attachment 50 or is not properly set thereon (step S47: NO), an error is displayed on the touch panel 21 or the like in step S48, and the tray 15 is returned to the discharge position. This can prompt the user to set the workpiece on the attachment 40.

The loading control means loads the tray 15 further, and the end portion of the attachment 50 sets the origin sensor 19 ON at the deepest position shown in FIG. 27(III), so that the origin in the loading is detected (step S49). The loading control means temporarily stops the loading operation of the attachment 50 at the origin position (step S50).

As described above, the workpiece identifying means calculates the position Dp of the adapter member 35 on the attachment 50 from the difference between fixed position D0 between the read sensor 18S, 18D and the origin sensor 19, and the loading distance D1 between the load-in position at which the adapter member 35 is detected by the read sensor 18S, 18D and the origin position, and identifies the type (kind and carving size) of the currently set porous impression die 91 (step S51).

The type information identified in step SS 1 may be displayed on the touch panel 21 or the like of the thermal carving machine 110. In subsequent step S52, consistency between the type information on the seal image data loaded into the thermal carving machine 110 and the type information identified from the position Dp of the adapter member 35 is determined. When those information are not consistent with each other (step S52: NO), an error is displayed on the touch panel 21 or the like (step S53), and the tray 15 is returned to the discharge position (step S42). This can prompt the user to set the workpiece on the attachment 40. In this manner, it is possible to discover mismatching between the porous impression die 91 and the seal image data before starting the carving, thereby preventing setting of a wrong porous impression die 91, an improper processing manipulation, and so forth.

When the type information are consistent with each other so that a proper porous impression die 91 is set (step S52: YES), the carving control means determines the carving start position for the seal face and the heating height position based on the identified type and carving size of the porous impression die 91 (step S54). Then, the loading control means controls the loading mechanism 16 to load the porous impression die 91 to the carving start position (step S55). After the porous impression die 91 is loaded to the carving start position, the elevation control means controls the elevation mechanism 14 to move the thermal head 12 down to the heating height position (step S56). At this stage, as shown in FIG. 27(IV), the thermal head 12 abuts on the top surface of the porous impression die 91 at the carving start position.

In next step S57, the thermal drive control means perform PWM control on the thermal drive means 13 according to one line of driving amount data to selectively and thermally drive the heat generating elements 12a, 12a, . . . on the thermal head 12. This cause the porous impression die 91 to be thermally carved by one line. In step S58, the loading control means controls the loading mechanism 16 to move the control device 11 by a one-line width in the loading direction (arrow-head direction in FIG. 27(IV)). The seal carving process of the porous impression die 91 is carried out line by line by repeating the processes of steps S56 and S58. When completion of the processing of the last end line is decided in step S59 (FIG. 27(V)), the elevation control means controls the elevation mechanism 14 to move the thermal head 12 upward to a standby position, and the loading control means controls the loading mechanism 16 to load the tray 15 to the discharge position (step S60).

Figure 28:
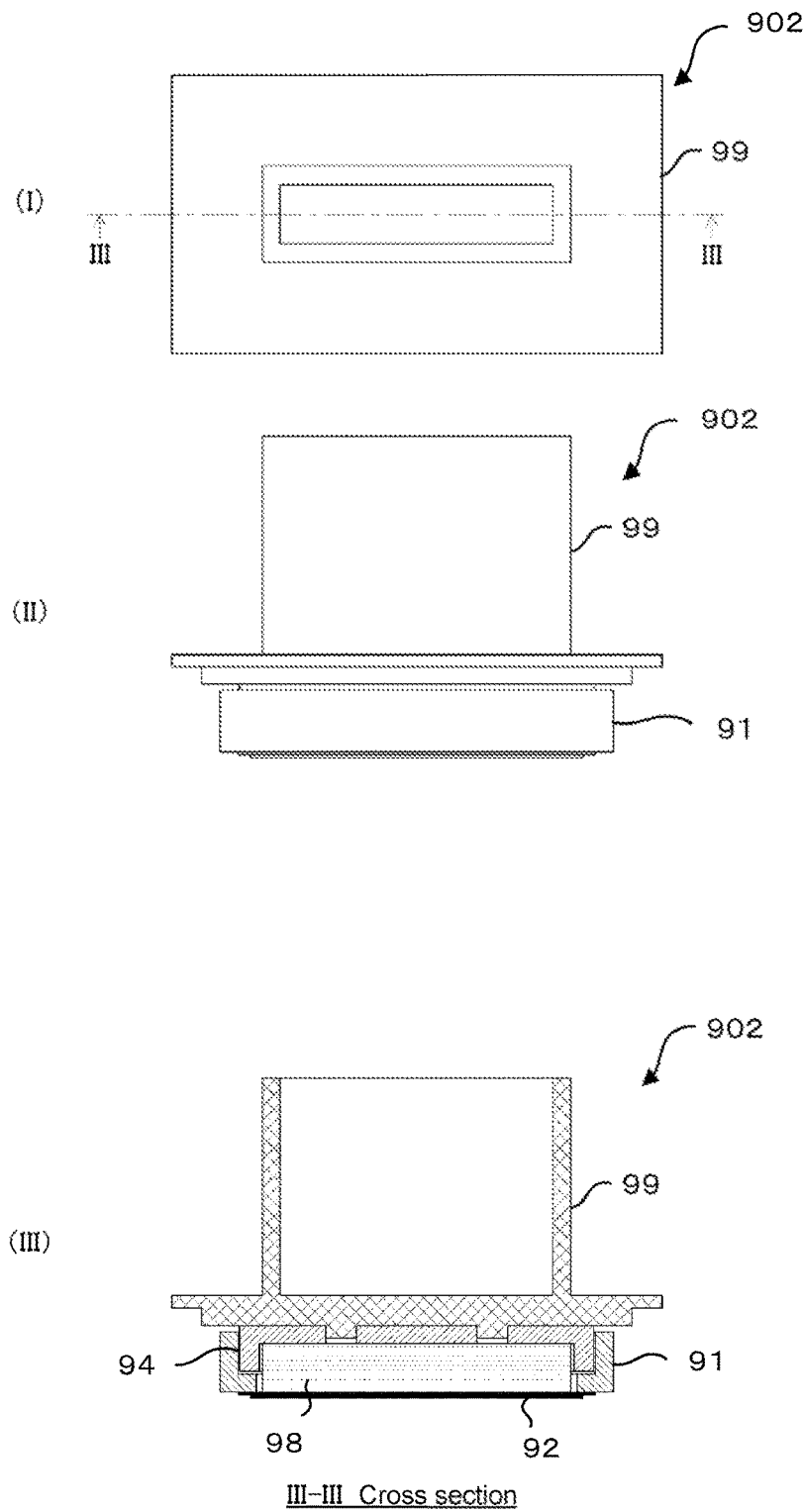
FIG. 28 provides a plan view, a side view and a cross-sectional view for describing assembling of a porous stamp according to the second embodiment.

The user can take out the attachment 50 from the discharged tray 15, and obtain the porous impression die 91 with the seal face formed thereon. The user may obtain the carved porous impression die 91 with the attachment 50 mounted on the tray 15, i.e., without taking the attachment 50 out of the tray 15. As illustrated in FIG. 28, impregnating the ink impregnated member 98 mounted on the porous impression die 91 with ink and attaching the holder 99 via the mount member 94, the user can assemble a porous stamp assembly 902 having a unique seal pattern as ordered.

Figure 29:
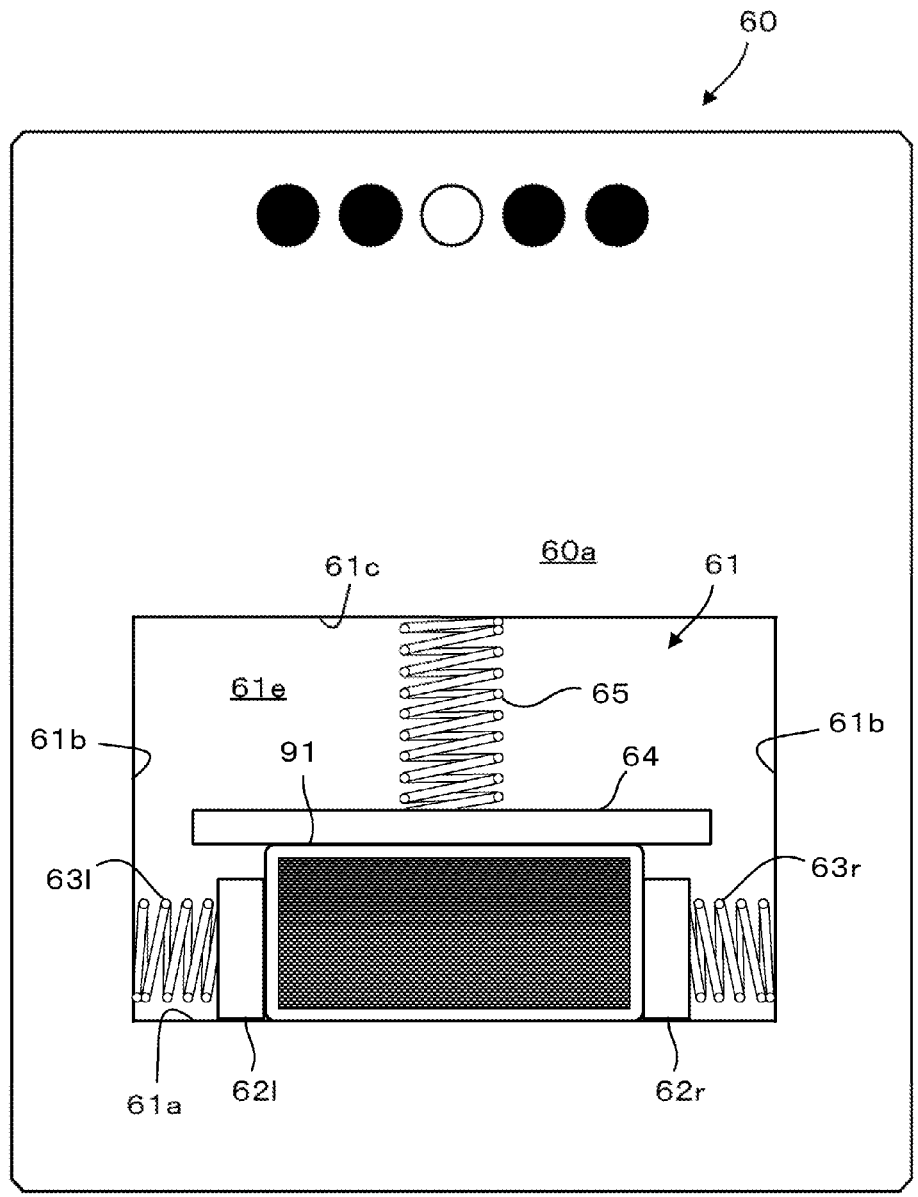
FIG. 29 is a plan view of an attachment according to another modification.

FIG. 29 is a plan view of an attachment 60 according to a modification of the second embodiment. A die setting part 61 having a flat setting surface 61e is formed on the body of the attachment 60 at a low-dented position with respect to a top surface 60a. The die setting part 61 is a planar rectangular parallelepiped groove having a reference wall surface 61a and an opposite wall surface 61c, which are parallel to each other, and side wall surfaces 61b, 61b which are orthogonal to the wall surfaces 61a, 61c.

Various sizes of porous impression dies 91 of can be set on the die setting part 61 of the attachment 50 each with its one side surface in abutment with the reference wall surface 61a. The attachment 50 is provided with holding parts 62l, 62r, 64 which are elastically urged toward the other side surface of the porous impression die 91 by pressing springs 63l, 63r, 65, respectively. The three side surfaces of the porous impression die 91 are pressed by the holding parts 62l, 62r, 64, which are urged by the respective pressing springs 63l, 63r, 65, to be held at a prescribed position of the die setting part 61. This allows various sizes of porous impression dies 91 to be set on a single attachment 60.

The type of the porous impression die 91 such as the vertical and horizontal outside dimensions, and the carving start position can be identified by detecting the positions of the holding parts 62l, 62r, 64 on the attachment 60. To detect the positions of the holding parts 62l, 62r, 64, the elongations of the pressing springs 63l, 63r, 65 may be detected by using an unillustrated photosensor or stroke sensor.

Figure 30:
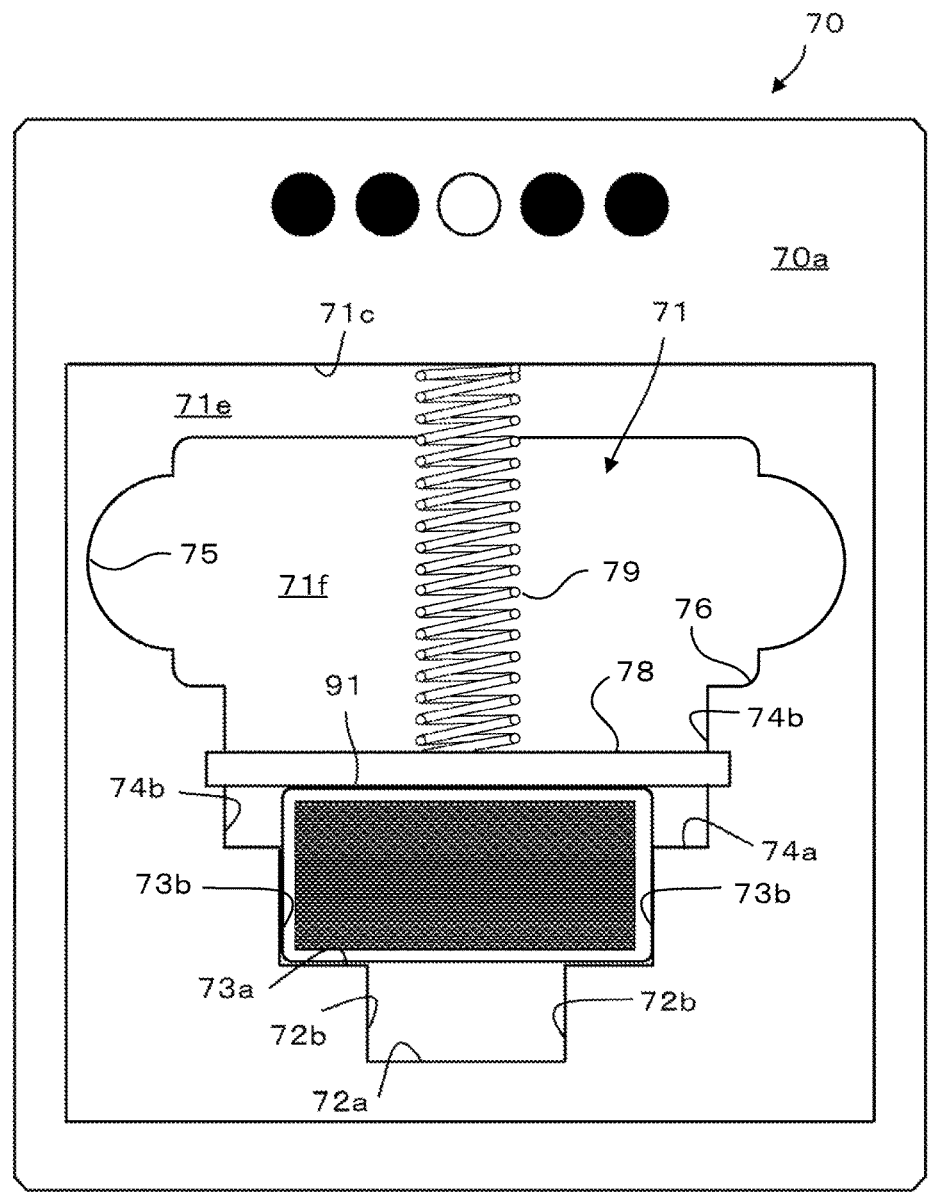
FIG. 30 is a plan view of an attachment according to a further modification.

FIG. 30 is a plan view of an attachment 70 according to a further modification. An intermediate surface 71e is formed on the body of the attachment 70 at a position lower than a top surface 70a. A die setting part 71 which is formed to have a setting surface 71f positioned lower than the intermediate surface 71e is formed to have a plurality of stepped grooves which become wider stepwise directions from the center so as to be respectively fit for one side surfaces of porous impression dies 91 of different sizes.

For a further detailed description, for example, a first reference wall surface 72a, a second reference wall surface 73a, and a third reference wall surface 74a, which are orthogonal to the loading direction, are formed to become longer stepwise in the loading direction of the attachment 70, the lengths of the reference wall surfaces 72a, 73a, 74a being set so that their outside dimensions allow the fitting of one sides of rectangular porous impression dies 91 of different outside dimensions. Side wall surfaces 72b, 72b standing upright orthogonal to the first reference wall surface 72a in the loading direction are formed at both widthwise ends of the first reference wall surface 72a. Likewise, side wall surfaces 73b, 73b standing upright orthogonal to the second reference wall surface 73a in the loading direction are formed at both widthwise ends of the second reference wall surface 73a, and side wall surfaces 74b, 74b standing upright orthogonal to the third reference wall surface 74a in the loading direction are formed at both widthwise ends of the third reference wall surface 74a.

In other words, as the die setting part 71, the first stepped groove having at least the first reference wall surface 72a, the second stepped groove having at least the second reference wall surface 73a, and the third stepped groove having at least the third reference wall surface 74a are formed in the attachment 70 according to this modification with the setting surface 71f dented from the intermediate surface 71e. As illustrated in FIG. 30, to be compatible with a porous impression die for a stamp having an oval outer shape, for example, a marginal groove having a semicircular wall surface 75 into which the arcuate side surface of the porous impression die can be fitted, or a marginal groove having a corner wall surface 76 which can be fitted over the four corners of the porous impression die may be formed.

The width sizes and the quantity of stepped grooves to be formed in the attachment 70 may be changed as needed according to the outer dimension or the number of the kinds of porous impression dies which are subjectable to seal carving.

FIG. 30 exemplifies the porous impression die 91 being fitted in the second stepped groove. The attachment 70 includes a holding part 78 which is elastically urged by a pressing spring 79 toward that surface of the porous impression die 91 which is opposite to the reference wall surface 73a. For example, the porous impression die 91 fitted into the second stepped groove is restricted to move in the widthwise direction (left-right direction in FIG. 30) by both side wall surfaces 73b, 73b of this stepped groove, and is held between the holding part 78, urged by the pressing spring 79, and the reference wall surface 73a to be held in the second stepped groove. The porous impression die 91, which has several stylized different dimensions, can be fitted in some stepped groove or marginal groove fit for this porous impression die, and can be set on the attachment 70 with its one side surface abutting on that stepped groove or marginal groove. Accordingly, various kinds and sizes of porous impression dies 91 can be set on a single attachment 70.

Because the porous impression die 91 has stylized outside dimensions, the workpiece identifying means can identify the position of the groove where the porous impression die 91 is fitted, the type such as the carving size, and the carving start position by detecting the position of the holding part 78 on the attachment 70. At the time of detecting the position of the holding part 78, the elongation of the pressing spring 79 may be detected using an unillustrated photosensor or stroke sensor.

3. Third Embodiment

A thermal carving machine 120 as a seal carving apparatus according to a third embodiment is described referring to FIGS. 31 to 41.

Figure 31:
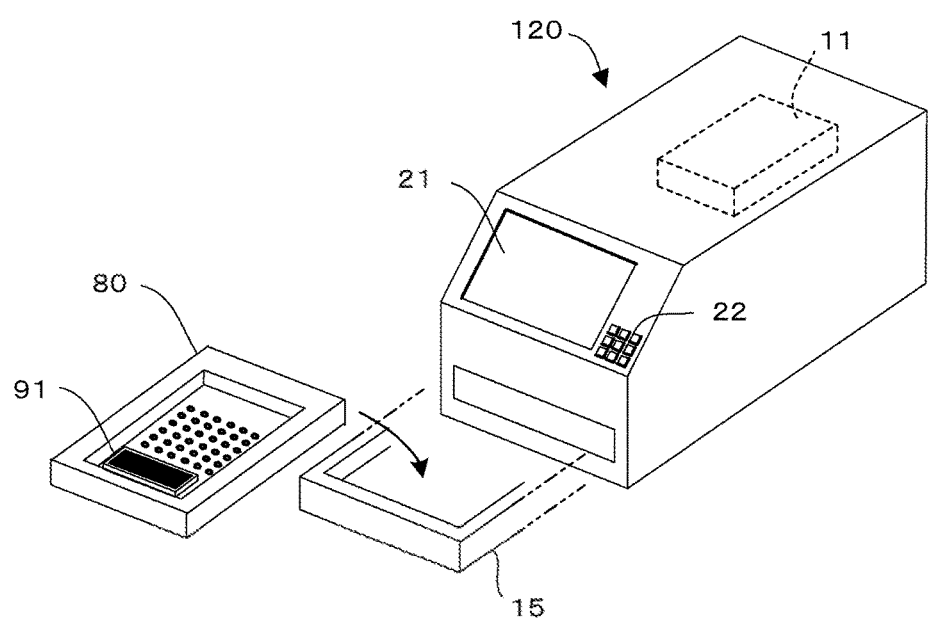
FIG. 31 is an external view of a thermal carving machine according to a third embodiment.
Figure 32:
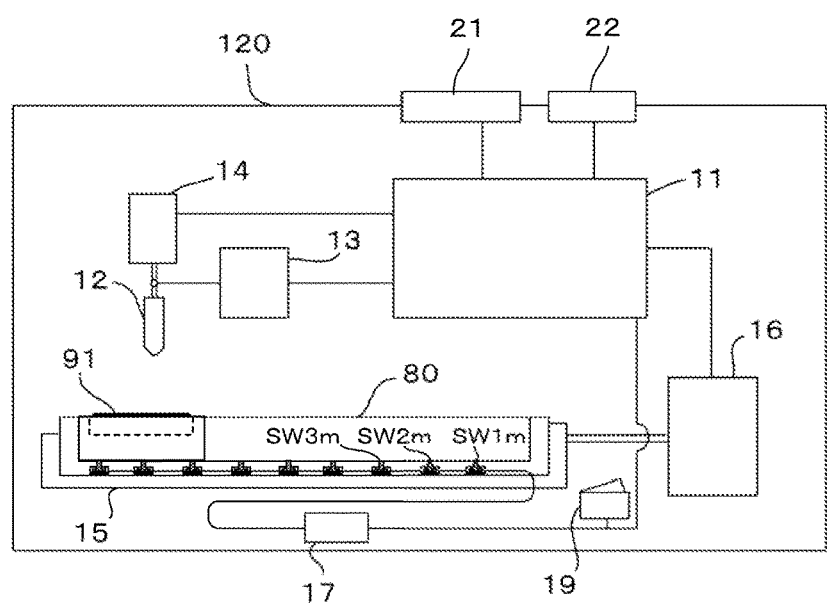
FIG. 32 is a block diagram illustrating the schematic configuration of the thermal carving machine of FIG. 31.

FIG. 31 is an external view illustrating the thermal carving machine 120. FIG. 32 is a block diagram illustrating the schematic configuration of the thermal carving machine 120. A porous impression die 91 which is a seal member of a porous stamp is set on an attachment 80 as illustrated in, for example, FIG. 34A. As will be described later in detail, a plurality of detection switches SW11 to SW98 to which the porous impression die 91 is fittable at an arbitrary position and which can detect the setting state of the porous impression die 91 are disposed in a lattice form at respective intersections orthogonal on that surface of the attachment 80 where the porous impression die 91 is to be set.

As illustrated in FIG. 31, a touch panel 21, ten keys 22, etc. for a user to operate the thermal carving machine 120 are provided on the front surface portion of the thermal carving machine 120. For example, a manipulation input screen for the thermal carving machine 120, and characters or the like indicating the operational state of the apparatus (completion of preparation, mounting of the attachment, reading data, printing, discharge of the attachment, an error, etc.), or information on the type of the porous impression die 91 (kind and carving size) currently set is displayed on the touch panel 21. A communication connector for connection to a network such as Ethernet (registered trademark), a power supply connector, and the like, thought not illustrated, are provided on the rear surface portion of the thermal carving machine 120.

In the thermal carving machine 120, an unillustrated external personal computer (PC) or dedicated terminal device may have a human interface function for manipulation inputs or displaying and the like, or may operate some parts of the processes instead of the internal control device 11.

As illustrated in FIG. 32, the control device 11 is connected with, in addition to the aforementioned touch panel 21 and ten keys 22, thermal drive means 13 that thermally drives a thermal head 12, an elevation mechanism 14 that moves up and down the thermal head 12, a loading mechanism 16 that loads a tray 15 and an attachment 80 in/out, a reading circuit 17 that reads data from the detection switches SW1m, SW2m, SW3m, . . . provided on the attachment 80, and the like. FIG. 32 illustrates an mth column (m is any integer) of detection switches. It is to be noted that the attachment 80 of the third embodiment is provided with, for example, 9×8 detection switches SW11 to SW98, 72 switches in total, illustrated in FIG. 34A, the states (ON/OFF data) of all the detection switches SW11 to SW98 are read by the reading circuit 17, which outputs the data to the control device 11, as described later.

The thermal carving machine 120 includes the tray 15 which is means for loading the attachment 40 mounted on the tray 15, and is configured in such a way that the loading mechanism 16 provided inside the thermal carving machine 120 reciprocally loads the porous impression die 91 and the attachment 80 between the discharge position where attachment/detachment is enabled, and an internal retaining position. The loading mechanism 16 is also means for relatively moving the porous impression die 91 and the thermal head 12 in abutment with each other.

Figure 33:
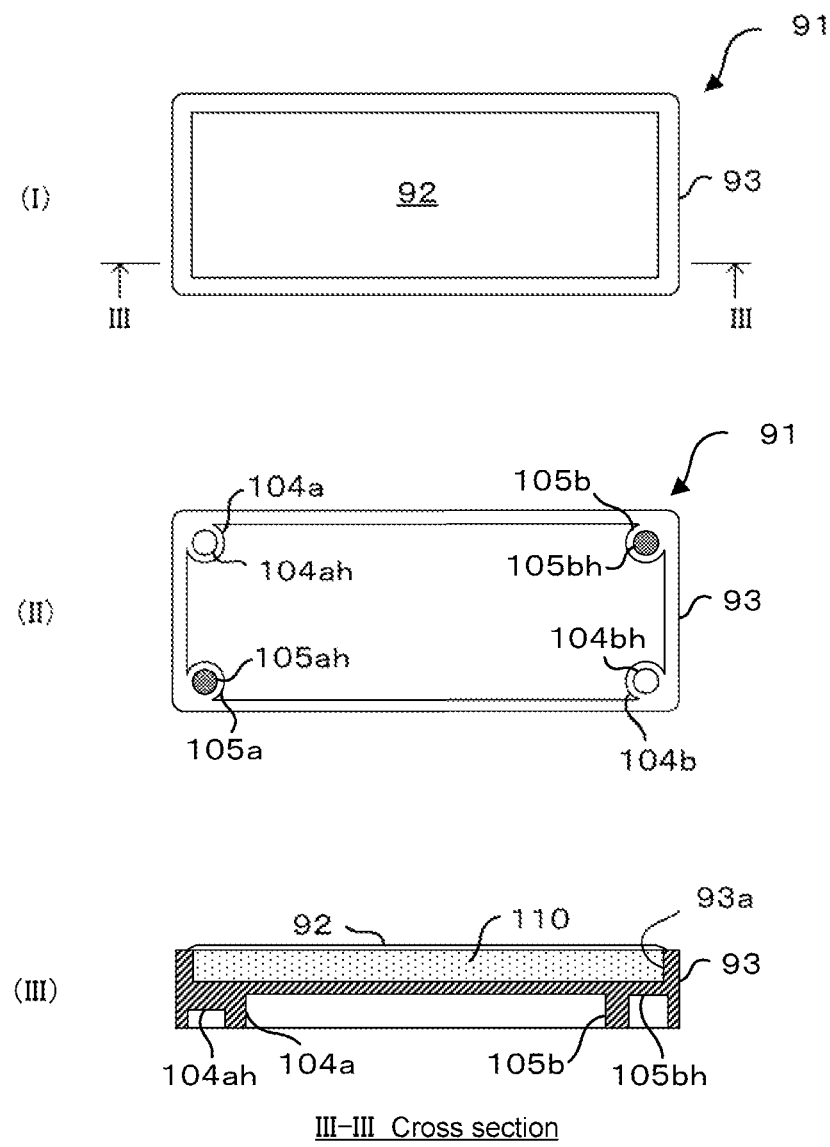
FIG. 33 provides a plan view, a rear view and a cross-sectional view of a rectangular type porous impression die which is an example of a workpiece according to the third embodiment.

FIG. 33(I) is a plan view of a rectangular porous impression die 91 as an example of a workpiece. FIG. 33(II) is a rear view of the porous impression die 91. FIG. 33(III) is a cross-sectional view of the porous impression die 91 taken along line III-III in FIG. 33(I). As illustrated in those diagrams, the rectangular type porous impression die 91 includes a rectangular enclosing frame 93 with an ink impregnated member 98 mounted in a recess 93a of the frame 93. A porous film 92 is adhered to the top surface of the frame 93 so as to block the recess 93 in which the ink impregnated member 98 is mounted.

As illustrated in FIG. 33(II), shallow-hole fitting parts 104a, 104b are formed at two diagonal corners of a rectangle on the bottom surface of the porous impression die 91, i.e., that side of the porous impression die 91 which is to be set on the attachment 80. Likewise, deep-hole fitting parts 105a, 105b are formed at two diagonal corners different from the diagonal corners for the shallow-hole fitting parts 104a, 104b on the bottom surface of the porous impression die 91. The shallow-hole fitting parts 104a, 104b have relatively shallow holes 104ah, 104bh shallow enough to set on the detection switches SWnm (wherein n is an integer of, for example, 1 to 9 indicating the nth row of detection switches, and m is an integer of, for example, 1 to 8 indicating the mth column of detection switches) over which the shallow-hole fitting parts 104a, 104b are fitted, while the shallow-hole fitting parts 104a, 104b are in abutment with the detection switches SWnm. On the other hand, the deep-hole fitting parts 105a, 105b have relatively deep holes 105ah, 105bh shallow enough to keep the OFF state of the fitted detection switches SWnm even when the deep-hole fitting parts 105a, 105b are fitted over the detection switches SWnm. The lateral distance between the shallow-hole fitting parts 104a, 104b in the widthwise direction of the porous impression die 91, and the longitudinal distance between the deep-hole fitting parts 105a, 105b in the widthwise direction of the porous impression die 91 are multiple folds of the pitches of the detection switches SW11 to SW98 (see, for example, 34A) to be described next.

Figure 34A:
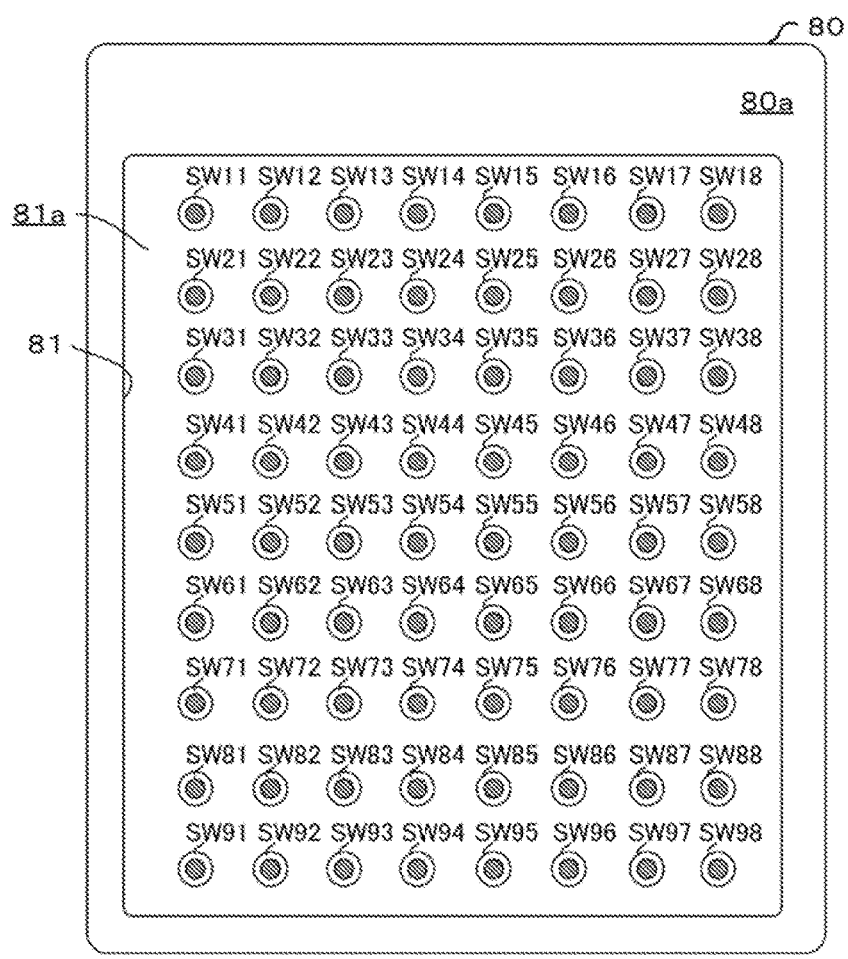
FIG. 34A is a plan view of an attachment according to the third embodiment.
Figure 34B:
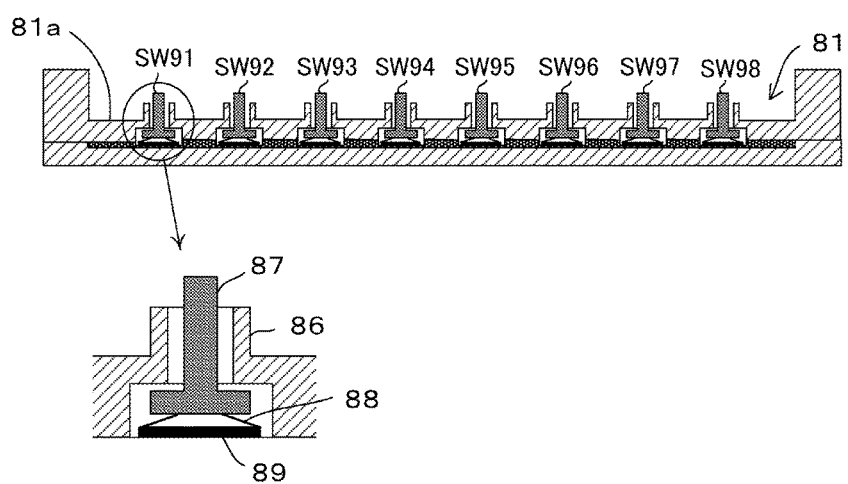
FIG. 34B is a cross-sectional view of the attachment according to the third embodiment.

Referring to FIGS. 34A and 34B, the attachment 80 and the detection switches SW11 to SW98 provided on the attachment 80 are further described in detail. The loading direction of the attachment 80 according to the third embodiment is the upward/downward direction in FIG. 34A. Particularly, the upward direction in FIG. 34A refers to "load-in direction" in which the attachment 80 moves toward the interior of the thermal carving machine 120, and particularly, the downward direction in FIG. 34A refers to "load-out direction" in which the attachment 80 moves outward from the thermal carving machine 120.

As illustrated in FIG. 34A, a die setting part 81 having a flat setting surface positioned dented lower with respect to a top surface 80a is formed on the body of the attachment 80. A plurality of detection switches SW11 to SW98 to which the porous impression die 91 is fittable at an arbitrary position on the setting surface 81a and which can detect the porous impression die 91 are disposed in a lattice form on the setting surface 81a of the die setting part 81 at respective intersections orthogonal to one another. As illustrated in FIG. 34B, for example, one detection switch SW91 includes a cylinder portion 86 projecting from the setting surface 81a, and a movable piece 87 that moves up and down within the cylinder portion 86. The movable piece 87 is normally urged upward by a spring 88. The detection switch SW91 is configured in such a way that a microswitch 89 is normally set off, and as the movable piece 87 is pressed downward against the urging force of the spring 88, the proximal end of the moved movable piece 87 sets the microswitch 89 on. The other detection switches have the same configuration as the detection switch SW91.

The holes 104ah, 104bh of the shallow-hole fitting parts 104a, 104b at the bottom surface of the porous impression die 91, and the holes 105ah, 105bh of the deep-hole fitting parts 105a, 105b have diameters large enough for each cylinder portion 86 to be inserted and fitted therein. That is, the shallow-hole fitting parts 104a, 104b and the deep-hole fitting parts 105a, 105b of the porous impression die 91 are fitted over one of the detection switches SW11 to SW98. This can permit the porous impression die 91 to be stably set on the setting surface 81a at an arbitrary position.

Figure 35A:
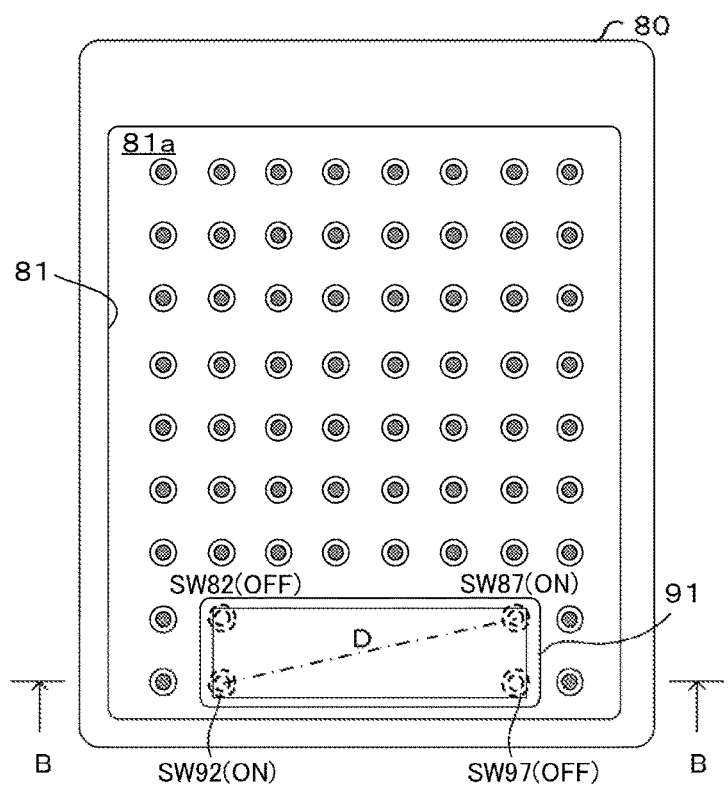
FIG. 35A is a plan view illustrating a porous impression die set on the attachment of FIG. 34A.
Figure 35B:
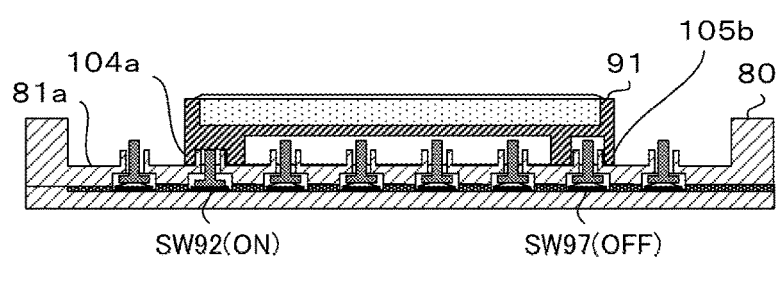
FIG. 35B is a cross-sectional view illustrating the porous impression die set on the attachment of FIG. 34A.

FIG. 35A is a plan view illustrating the porous impression die 91 set at the center of the loading-directional end of the die setting part 81 of the attachment 80 as an example. FIG. 35B is a cross-sectional view taken along line B-B in FIG. 35A. With the porous impression die 91 set on the attachment 80 at the position shown in FIG. 35A, fitting the shallow-hole fitting parts 104a, 104b over the detection switches SW92, SW87 sets those detection switches SW92, SW87 on. In other words, the bottoms of the holes 104ah, 104h of the shallow-hole fitting parts 104a, 104b move the movable pieces 87 of the detection switches SW92, SW87 downward to set the projecting step 89 on. The holes 105ah, 105bh of the deep-hole fitting parts 105a, 105b are formed deeper than the holes 104ah, 104bh of the shallow-hole fitting parts 104a, 104b. Even when the deep-hole fitting parts 105a, 105b are fitted over the detection switches SW92, SW87, therefore, the movable pieces 87 of the detection switches SW92, SW87 do not contact the bottoms of the holes 105ah, 105bh, so that the OFF state is maintained.

Based on the positions of the detection switches SW92, SW87 that have been set on by the fitting of the diagonally positioned shallow-hole fitting parts 104a, 104b of the porous impression die 91, the setting position of the porous impression die 91 on the setting surface 81a of the attachment 80 can be identified. Based on a diagonal line D connecting the positions of the detection switches SW92, SW87 that are ON, the carving size of the stylized porous impression die 91 can also be identified. Further, the carving start position and end position for the seal of the porous impression die 91 can also be identified based on information on the setting position and carving size of the porous impression die 91 which are identified from the positions of the detection switches SW92, SW87.

Figure 36:
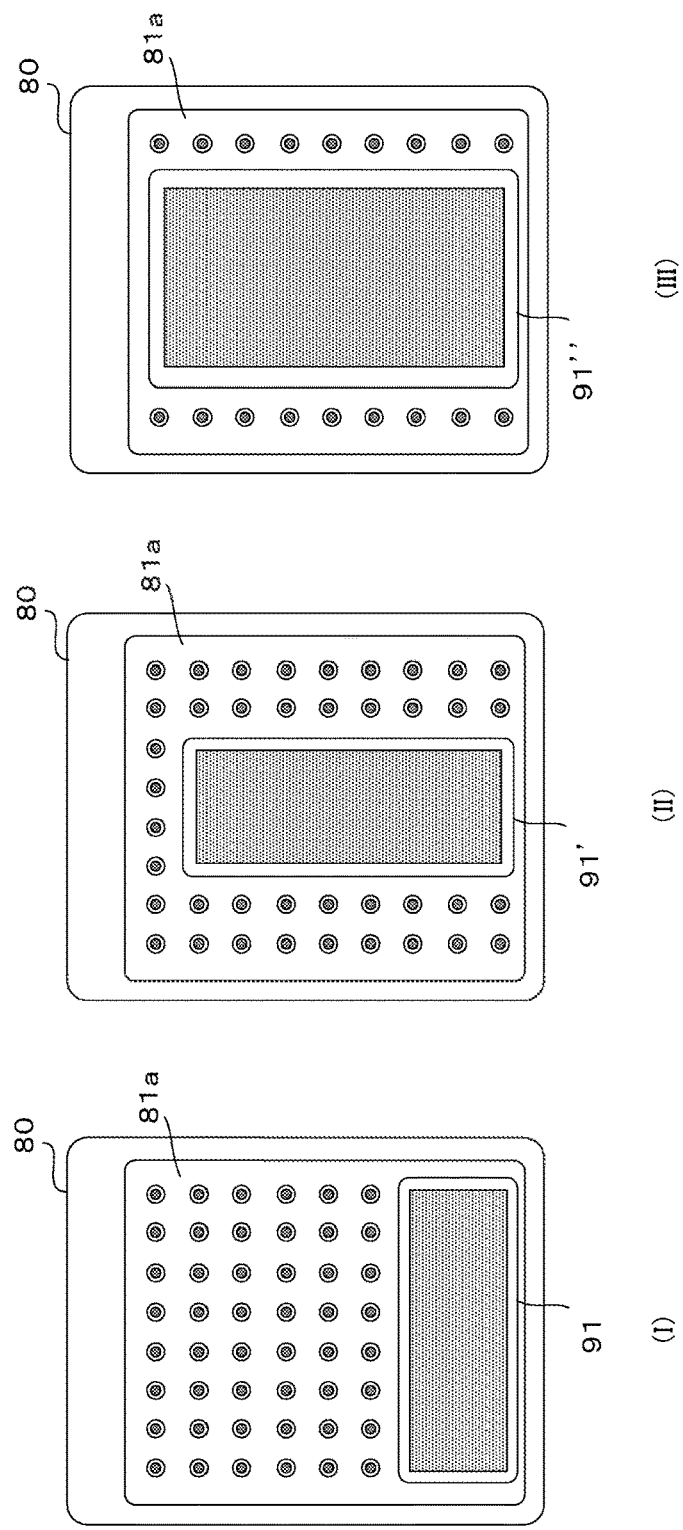
FIG. 36 is a plan view illustrating an example where various porous impression dies are set on the attachment of FIG. 34A.
Figure 37:
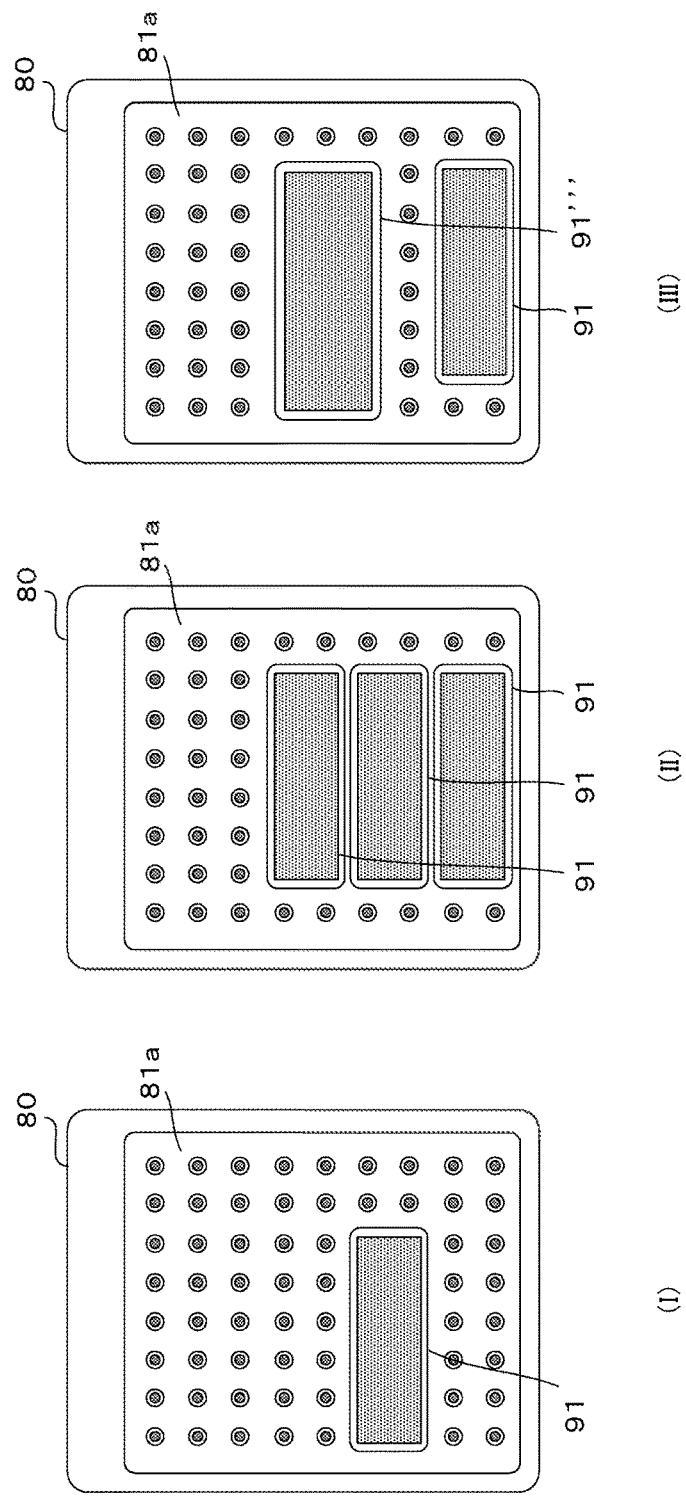
FIG. 37 is a plan view further illustrating an example where various porous impression dies are set on the attachment of FIG. 34A.

While the correlation between the area of the setting surface 81a of the attachment 80 and the size of a porous impression die 91 to be set thereon has some restrictions, porous impression dies 91, 91', 91" of various carving sizes as illustrated in, for example, FIG. (I) to (III) of FIG. 36 can be set at a longitudinal/lateral arbitrary position within the range that allow for the restrictions. Further, not only a single porous impression die 91 can be set on the setting surface 81a of the attachment 80 at an arbitrary position, as exemplified in FIG. 37(I), but also a plurality of porous impression dies 91 can be set on the setting surface 81a at the same time as exemplified in FIG. 37(II). Moreover, a plurality of porous impression dies 91, 91'" of different sizes can be set on the setting surface 81a at the same time as exemplified in FIG. 37(III).

Next, the individual control means included in the thermal carving machine 120 along with their operations are described.

Figure 38:
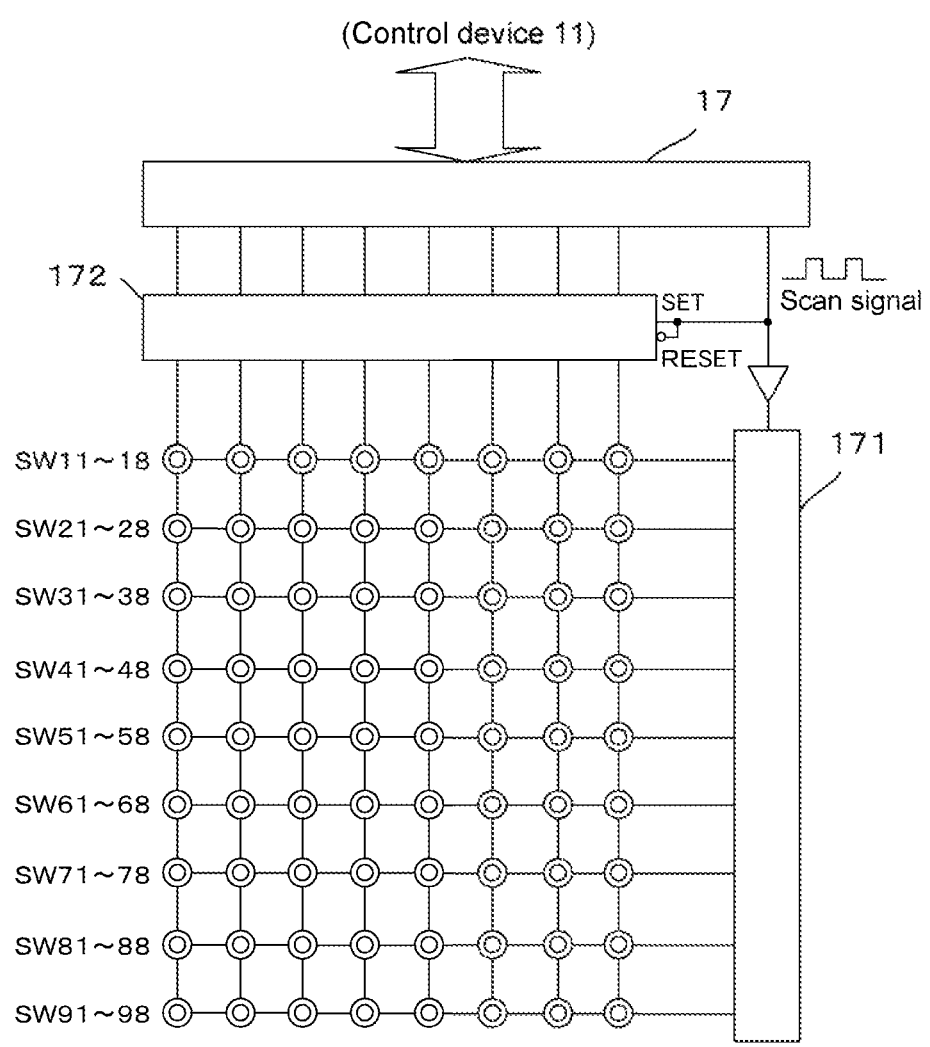
FIG. 38 is a block diagram illustrating an example circuit for reading data from detection switches in FIG. 34A.

The control device 11 of the thermal carving machine 120 may individual read ON/OFF switch signals from the individual detection switches SW11 to SW98, or may adopt such a configuration that the reading circuit 17 reads ON/OFF data from the detection switches SW11 to SW98 in a scanning manner, as shown in the block diagram of FIG. 38 for example.

According to the scan type embodiment of FIG. 38, in a step where the control device 11 reads the states of the detection switches SW11 to SW98, the reading circuit 17 outputs, for example, nine cyclic signals, corresponding to the number of the rows of the detection switches SW11 to SW98, to a switching circuit 171. The switching circuit 171 sequentially supplies the current to the nth row of detection switches SWn1, SWn2, . . . , SWn8 upon each reception of the scan signal (n=1, 2, . . . , 9). That is, the switching circuit 171 repeatedly changes over the output destinations by the number of times of the rows (n=9), in such a way that when the first (n=1) scan signal is output, the switching circuit 171 supplies the current only to the first row of detection switches SW11 to SW18, and when the second (n=2) scan signal is output, the switching circuit 171 supplies the current only to the second row of detection switches SW21 to SW28.

At the same time, a set/reset signal is input to a latch circuit 172 in synchronism with the scan signal. That is, when the first (n=1) scan signal is output, the latch circuit 172 captures (latches) information from the first row of detection switches SW11 to SW18, and outputs the information to the reading circuit 17. When the scan signal level falls, the information captured by the latch circuit 172 is reset, and when the second (n=2) scan signal is output, the latch circuit 172 likewise latches information from the second row of detection switches SW21 to SW28, and outputs the information to the reading circuit 17. In this way, the reading circuit 17 scans the first to ninth rows to read ON/OFF data indicative of the states of all the detection switches SW11 to SW98.

The workpiece identifying means included in the control device 11 identifies the setting position of the porous impression die 91 on the setting surface 81a of the attachment 80 based on the individual positions of the detection switches SWnm, SWn'm' that have been set ON as the porous impression die 91 is set on the attachment 80. The workpiece identifying means also identifies the kind and carving size of the stylized porous impression die 91 based on the diagonal line D connecting the positions of the detection switches SWnm, SWn'm' that are ON.

Figure 39:
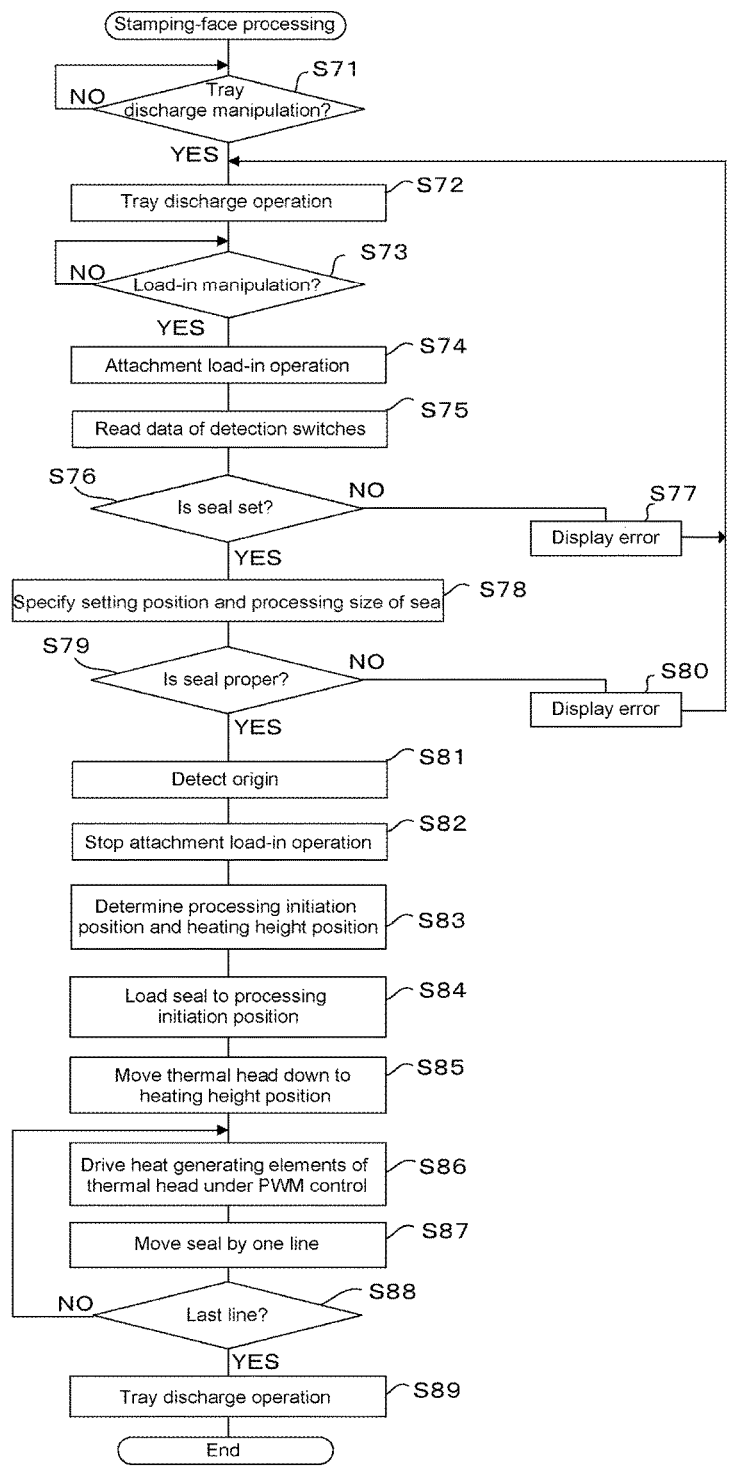
FIG. 39 is a flowchart exemplifying seal carving processes in the thermal carving machine according to the third embodiment.
Figure 40:
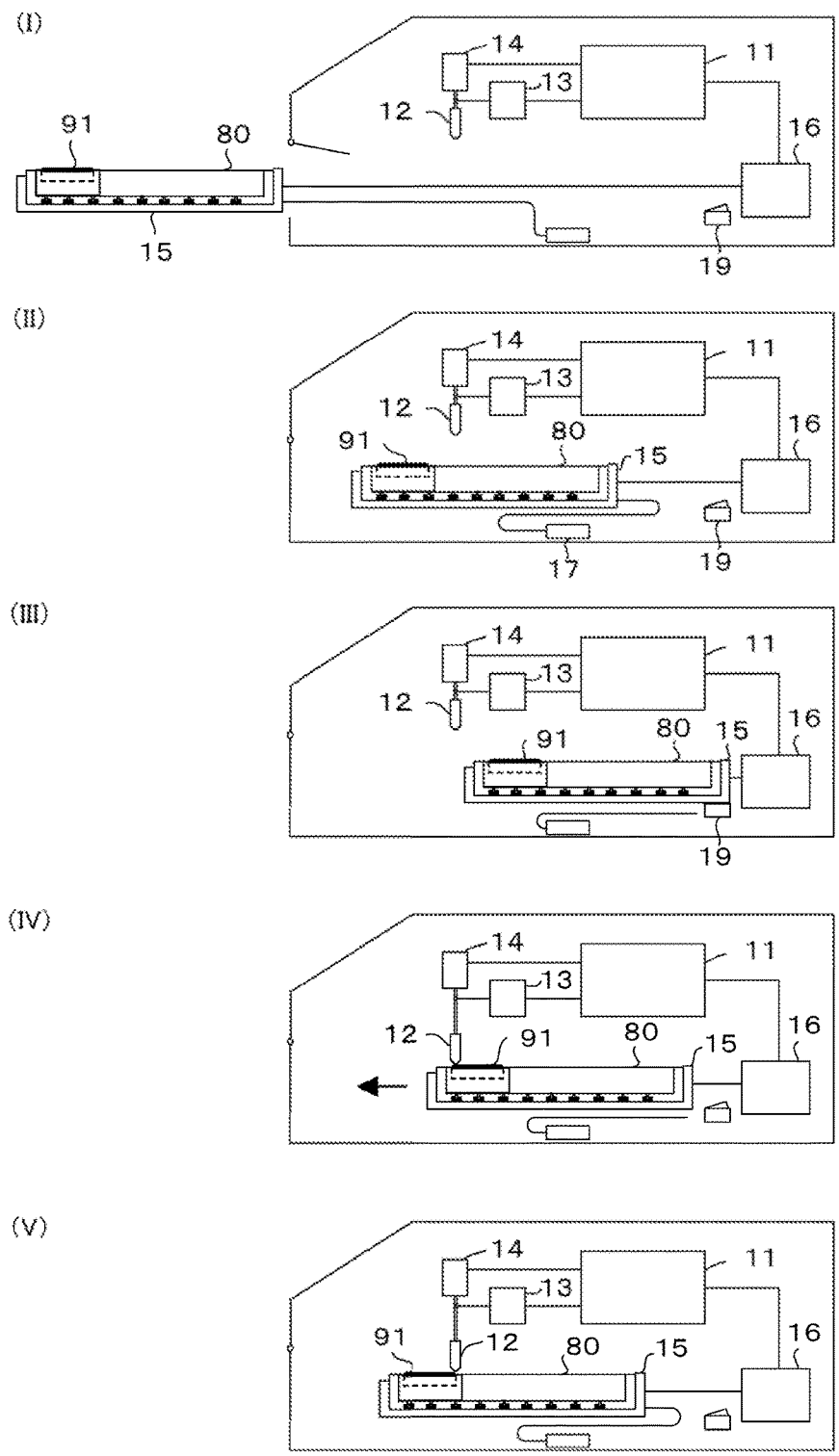
FIG. 40 is a diagram for describing a seal carving operation in the thermal carving machine according to the third embodiment.

Next, seal carving process which is performed by carving control means included in the control device 11 is described. FIG. 39 is a flowchart exemplifying seal carving processes which is performed by the carving control means. FIG. 40 is a diagram for describing the seal carving operation of the thermal carving machine 120. The carving control means includes loading control means, elevation control means and thermal drive control means which will be described next.

First, a user (including a person who has ordered a stamp or a sales person) sets the porous impression die 91 to be subjected to seal carving at an arbitrary position of the attachment 80, and sets the porous impression die 91 on the attachment 80. When a manipulation of discharging the tray 15 is performed through the touch panel 21 or the like (step S71), the loading control means controls the loading mechanism 16 to load the tray 15 to the discharge position shown in FIG. 40(I) (step S72). Then, the user mounts the attachment 80 with the porous impression die 91 set thereon on the discharged tray 15. The user may set the porous impression die 91 on the attachment 80 after mounting the attachment 80 on the tray 15, or may set the porous impression die 91 on the attachment 80 which has already been mounted on the tray 15.

When the load-in manipulation is performed via the touch panel 21 or the like (step S73), the loading control means controls the loading mechanism 16 to start the loading of the attachment 80 inside (step S74). In the process of loading the attachment 80 toward the origin, switch data reading means in the control device 11 reads ON/OFF data indicative of the states of the detection switches SW11 to SW98 via the reading circuit 17 at the load-in position shown in, for example, FIG. 40(II) (step S75).

In next step S76, the setting state of the porous impression die 91 onto the attachment 80 is examined from the ON/OFF data from the detection switches SW11 to SW98 that are read by the aforementioned switch data reading means. When the control device 11 recognizes that at least two of the detection switches SW11 to SW98 are ON, the control device 11 determines that the porous impression die 91 is properly set on the attachment 80 (step S76: YES). When every one of the detection switches SW11 to SW98 is OFF, or when one detection switch or an odd number of detection switches are ON, the control device 11 determines that the porous impression die 91 is not set, or is not properly set, on the attachment 80 (step S76: NO). In this case, an error is displayed on the touch panel 21 or the like (step S77), and the tray 15 is returned to the discharge position (step S72). This can prompt the user to set the porous impression die 91 on the attachment 80.

In next step S78, the workpiece identifying means identifies the setting position and the kind of the porous impression die 91 based on the individual positions of the detection switches SWnm, SWn'm' that are ON. Further, the workpiece identifying means identifies the carving size of the porous impression die 91 based on the length of the diagonal line connecting the individual positions of the detection switches SWnm, SWn'm' that are ON.

The type information identified in step S78 may be displayed on the touch panel 21 or the like of the thermal carving machine 120. In subsequent step S79, consistency between the type information on the seal image data loaded into the thermal carving machine 120 and the type information identified from the detection switches SWnm, SWn'm' is determined. When those information are not consistent with each other (step S79: NO), an error is displayed on the touch panel 21 or the like (step S80), and the tray 15 is returned to the discharge position (step S72). This can prompt the user to set the workpiece on the attachment 80. In this manner, it is possible to discover mismatching between the porous impression die 91 and the seal image data before starting the carving, thereby preventing setting of a wrong porous impression die 91, an improper processing manipulation, and so forth.

The loading control means further loads the tray 15 inside, and at the deepest position shown in FIG. 40(III), the end portion of the attachment 80 sets the origin sensor 19 ON to thereby detect the origin in the loading (step S81). At the origin position, the loading control means temporarily stops the loading operation (step S82).

Then, the carving control means determines the carving start position for the seal face and the heating height position based on the identified setting position of the porous impression die 91 and the type information whose consistency has been approved (step S83). Then, the loading control means controls the loading mechanism 16 to load the porous impression die 91 to the carving start position (step S84). After the porous impression die 91 is reached to the carving start position, the elevation control means controls the elevation mechanism 14 to move the thermal head 12 down to the heating height position (step S85). At this stage, as shown in FIG. 40(IV), the thermal head 12 abuts on the top surface of the porous impression die 91 at the carving start position.

In next step S86, the thermal drive control means perform PWM control on the thermal drive means 13 according to one line of driving amount data to selectively and thermally drive the heat generating elements 12a, 12a, . . . on the thermal head 12. This cause the porous impression die 91 to be thermally carved by one line. In step S87, the loading control means controls the loading mechanism 16 to move the control device 11 by a one-line width in the loading direction (arrow-head direction in FIG. 40(IV)). The seal carving of the porous impression die 91 is carried out line by line by repeating the processes of steps S86 and S87. When the carving process of the last end line is completed in step S88 (FIG. 40(V)), the elevation control means controls the elevation mechanism 14 to move the thermal head 12 upward to a standby position, and the loading control means controls the loading mechanism 16 to load the tray 15 to the discharge position (step S89).

Figure 41:
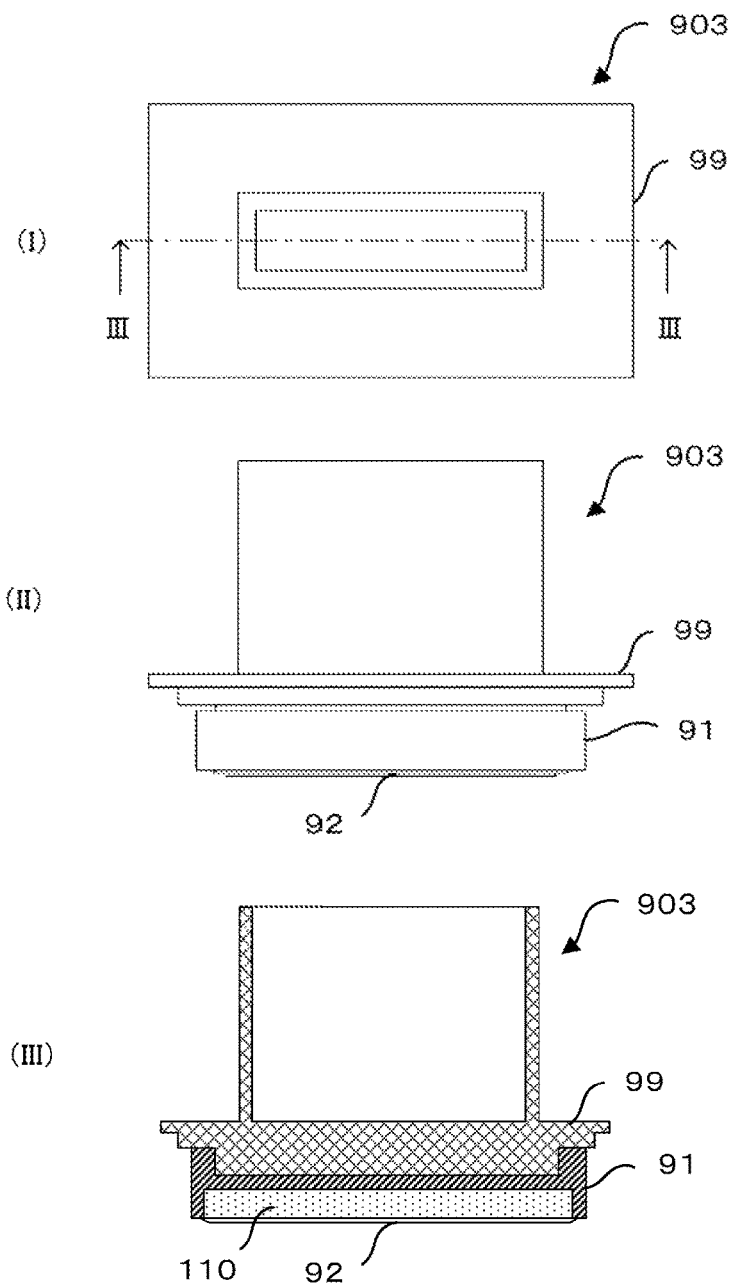
FIG. 41 provides a plan view, a side view and a cross-sectional view for describing assembling of a porous stamp according to the third embodiment.

The user can take out the attachment 80 from the discharged tray 15, and obtain the porous impression die 91 with the seal face formed thereon. The user may obtain the carved porous impression die 91 with the attachment 80 mounted on the tray 15, i.e., without taking the attachment 80 out of the tray 15. As illustrated in FIG. 41, impregnating the ink impregnated member 98 mounted on the porous impression die 91 with ink and attaching the holder 99, the user can assemble a porous stamp assembly 902 having a unique seal pattern as ordered.

Although the preferred embodiments of the seal carving apparatus and the thermal carving machine according to the invention have been described, the technical concept of the invention shall not be construed to be limited to the embodiments described herein. Persons skilled in the art may change or improve those embodiments as needed without departing from the subject matter or technical concept of the invention. The peripheral techniques relating to seal carving apparatuses involving such changes or improvements should be understood to be encompassed within the technical scope of the invention.

REFERENCE SIGNS LIST

11 Control device
12 Thermal head
12*a* Heat generating elements
13 Thermal drive means
14 Elevation mechanism
15 Tray
16 Loading mechanism
17 Reading circuit
18S, 18D Photosensor (reading means)
19 Origin sensor
21 Touch panel
22 Ten keys
30 Terminal device
35 Adapter member
36 Flange part
37*l*, 37*r* Holding parts
38*l*, 38*r* Abutment surfaces
40, 50, 60, 70, 80 Attachment
91 Porous impression die
92 Porous film
93 Frame
99 Holder
98 Ink impregnated member
100 Seal carving apparatus
110, 120 Thermal carving machine
901, 902, 903 Porous stamp assembly
D Diagonal line of porous impression die
SW11-SW98 Detection switches

What is claimed is:

1. A seal carving apparatus comprising:
  a thermal head having a plurality of heat generating elements disposed in a line;
  a dedicated attachment where a workpiece on which a seal is intended to be formed is set;
  loading means that moves the workpiece set on the attachment and the thermal head in relative to each other with the workpiece being in abutment with the attachment; and
  a control device that selectively and thermally drives individual heat generating elements of the plurality of heat generating elements of the thermal head while controlling the relative movement performed by the loading means to perform a carving process of forming a seal on the workpiece,
  wherein dot pattern perforations predetermined according to a type of the workpiece to be set are formed in a part of a body of the attachment.

2. The seal carving apparatus according to claim 1, comprising reading means that reads the dot pattern perforations formed in the attachment at a position where the attachment is mounted.

3. The seal carving apparatus according to claim 2, wherein
  the reading means is a photosensor that reads the dot pattern perforations by means of transmission or reflection of light.

4. The seal carving apparatus according to claim 2, wherein
  the control device is communicatively connected with a terminal device operable by a user, and performs a process of examining consistency between information on the type of the workpiece input to the terminal device by the user and information on the dot pattern perforations read by the reading means.

5. The seal carving apparatus according to claim 2, wherein
  a notch that is blocked by a part of the workpiece when the workpiece is set is formed in the body of the attachment, and as the reading means reads a state of the notch at a position in which the attachment is loaded, a setting state of the workpiece to the attachment is examined.

6. A thermal carving machine comprising:
  a thermal head having a plurality of heat generating elements disposed in a line;
  an attachment where a workpiece on which a seal is to be formed is set via an adapter member;
  loading means that loads the attachment inside, and moves the workpiece set on the attachment and the thermal head in relative to each other with the workpiece being in abutment with the attachment; and
  a control device that selectively and thermally drives individual heat generating elements of the plurality of heat generating elements of the thermal head while controlling the relative movement performed by the loading means to perform a carving process of forming a seal on the workpiece,
  wherein the workpiece is held between a reference surface formed on the attachment and an inclined surface formed on the adapter member.

7. The thermal carving machine according to claim 6, wherein
  the inclined surface of the adapter member comprises two abutment surfaces inclined in such a way that an interval therebetween becomes narrower toward a widthwise center of the attachment.

8. The thermal carving machine according to claim 6, wherein
  the control device identifies the type of the workpiece based on a relative position of the adapter member on the attachment.

9. The thermal carving machine according to claim 8, wherein
  a slit hole extending in a loading direction is formed in a widthwise center of the attachment, and a photosensor that detects the adapter member through the slit hole detects the relative position of the adapter member on the attachment.

10. The thermal carving machine according to claim 6, wherein
  both end portions of the adapter member are fitted at predetermined positions of the attachment.

11. The thermal carving machine according to claim 10, wherein
  a type code indicative of a type of a corresponding workpiece is printed at the predetermined positions of the attachment where the both end portions of the adapter member are fitted.

12. A thermal carving machine comprising:
a thermal head having a plurality of heat generating elements disposed in a line;
an attachment where a workpiece on which a seal is to be formed is set;
loading means that loads the attachment inside, and moves the workpiece set on the attachment and the thermal head in relative to each other with the workpiece being in abutment with the attachment; and
a control device that selectively and thermally drives individual heat generating elements of the plurality of heat generating elements of the thermal head while controlling the relative movement performed by the loading means to perform a carving process of forming a seal on the workpiece,
wherein a mount part having a wall surface on which one side surface of the workpiece abuts with the workpiece set on the attachment is formed on the attachment, and
at least one holding member that is elastically urged toward an opposite surface of the workpiece to the one side surface thereof to hold the workpiece in abutment with the opposite surface is provided on the mount part.

13. The thermal carving machine according to claim 12, wherein
a second holding member that is elastically urged toward another surface of the workpiece that is orthogonal to the opposite surface of the workpiece to hold the workpiece in abutment with the another surface is further provided on the mount part.

14. A thermal carving machine comprising:
a thermal head having a plurality of heat generating elements disposed in a line;
an attachment where a workpiece on which a seal is to be formed is set;
loading means that loads the attachment inside, and moves the workpiece set on the attachment and the thermal head in relative to each other with the workpiece being in abutment with the attachment; and
a control device that selectively and thermally drives individual heat generating elements of the plurality of heat generating elements of the thermal head while controlling the relative movement performed by the loading means to perform a carving process of forming a seal on the workpiece,
wherein a mount part having a plurality of stepped grooves having widths respectively fitting one side surfaces of the workpieces of different sizes and becoming wider stepwise is formed on the attachment,
the workpiece is set on attachment with the workpiece being fitted in one of the stepped grooves that fits the workpiece and the one side surface abutting on a reference wall surface of that stepped groove, and
a holding member that is elastically urged toward an opposite surface of the workpiece to the one side surface thereof is provided on the mount part.

15. The thermal carving machine according to claim 12, wherein
the control device identifies the type of the workpiece based on a position of the holding member on the attachment.

16. A thermal carving machine comprising:
a thermal head having a plurality of heat generating elements disposed in a line;
an attachment where a workpiece on which a seal is to be formed is set;
loading means that loads the attachment inside, and moves the workpiece set on the attachment and the thermal head in relative to each other with the workpiece being in abutment with the attachment; and
a control device that selectively and thermally drives individual heat generating elements of the plurality of heat generating elements of the thermal head while controlling the relative movement performed by the loading means to perform a carving process of forming a seal on the workpiece,
wherein a plurality of detection switches that enable the workpiece to be fitted at an arbitrary position on a surface of that side of the attachment where the workpiece is to be set and are capable of detecting the workpiece are disposed in a lattice form at respective intersections orthogonal to one another.

17. The thermal carving machine according to claim 16, wherein
shallow-hole fitting parts that are respectively fitted to the plurality of detection switches are formed at at least two corners diagonally positioned on that side of the workpiece which is set on the attachment, and
as the shallow-hole fitting parts are fitted to the plurality of detection switches with the workpiece being set on the attachment, the respective detection switches of the plurality of detections switches are turned on, so that at least a setting position of the workpiece on the attachment is identified based on positions of the turned-on detection switches of the plurality of detection switches.

18. The thermal carving machine according to claim 17, wherein
a carving size of the workpiece is further identified based on the positions of the turned-on detection switches of the plurality of detection switches.

19. The thermal carving machine according to claim 17, wherein
deep-hole fitting parts that have holes deeper than holes of the shallow-hole fitting parts and are fitted to the plurality of detection switches are formed at corners on that side of the workpiece which is set on the attachment and different from the at least two corners where the shallow-hole fitting parts are formed, and
with the workpiece being set on the attachment, an OFF state of detection switches of the plurality of detection switches to which the deep-hole fitting parts are fitted is maintained.

20. The thermal carving machine according to claim 16, wherein
a plurality of workpieces of a same size or different sizes are settable on the attachment at a same time.

* * * * *